(12) United States Patent
Parker et al.

(10) Patent No.: US 7,385,984 B2
(45) Date of Patent: Jun. 10, 2008

(54) PACKET PROCESSING SYSTEM ARCHITECTURE AND METHOD

(75) Inventors: David K. Parker, Cheltenham (GB); Erik R. Swenson, San Jose, CA (US); Michael M. Yip, Los Altos, CA (US); Christopher J. Young, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 841 days.

(21) Appl. No.: 10/814,552

(22) Filed: Mar. 30, 2004

(65) Prior Publication Data

US 2005/0226253 A1 Oct. 13, 2005

(51) Int. Cl.
*H04L 12/28* (2006.01)
(52) U.S. Cl. .................. 370/392; 370/412; 370/474; 370/401
(58) Field of Classification Search ............ None
See application file for complete search history.

(56) References Cited

U.S. PATENT DOCUMENTS

| | | | |
|---|---|---|---|
| 6,034,957 A | 3/2000 | Haddock et al. | |
| 6,295,299 B1 | 9/2001 | Haddock et al. | |
| 6,381,242 B1 | 4/2002 | Maher, III et al. | 370/394 |
| 6,807,183 B1 * | 10/2004 | Chow et al. | 370/401 |
| 6,914,905 B1 | 7/2005 | Yip | |
| 6,917,617 B2 | 7/2005 | Jin et al. | 370/395.21 |

(Continued)

FOREIGN PATENT DOCUMENTS

WO  WO 03/081857  10/2003

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Duc Ho
(74) *Attorney, Agent, or Firm*—Howrey LLP

(57) ABSTRACT

A packet processing system architecture and method are provided. According to a first aspect of the invention, a plurality of quality of service indicators are provided for a packet, each with an assigned priority, and a configurable priority resolution scheme is utilized to select one of the quality of service indicators for assigning to the packet. According to a second aspect of the invention, wide data paths are utilized in selected areas of the system, while avoiding universal utilization of the wide data paths in the system. According to a third aspect of the invention, one or more stacks are utilized to facilitate packet processing. According to a fourth aspect of the invention, a packet size determiner is allocated to a packet from a pool of packet size determiners, and is returned to the pool upon or after determining the size of the packet. According to a fifth aspect of the invention, a packet is buffered upon or after ingress thereof to the system, and a packet for egress from the system assembled from new or modified packet data and unmodified packet data as retrieved directly from the buffer. According to a sixth aspect of the invention, a system for preventing re-ordering of packets in a packet processing system is provided. A seventh aspect of the invention involves any combination of one or more of the foregoing.

17 Claims, 18 Drawing Sheets

U.S. PATENT DOCUMENTS

| | | | |
|---|---|---|---|
| 6,957,258 | B2 | 10/2005 | Maher, III et al. .......... 709/224 |
| 2002/0163909 | A1* | 11/2002 | Sarkinen et al. ............ 370/386 |
| 2002/0163935 | A1* | 11/2002 | Paatela et al. .............. 370/466 |
| 2003/0193949 | A1 | 10/2003 | Kojima et al. |
| 2004/0003110 | A1 | 1/2004 | Ozguner |
| 2004/0246981 | A1 | 12/2004 | He et al. |
| 2005/0074009 | A1 | 4/2005 | Kanetake |

OTHER PUBLICATIONS

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via Incremental Update*, May 1994, available at: http://www.faqs.org/rfcs/rfc1624.html.

Netlogic Microsystems, Product Brief NSE5000GLQ, Copyright 2004, available at: http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

International Search Report for PCT/US05/10544, dated Jun. 29, 2006.

* cited by examiner

| BIT | FUNCTION | DESCRIPTION |
|---|---|---|
| 15-0 | PTI | PORT TAG INDEX. |
| 19-16 | EQoS | EGRESS QUEUE SELECT. |
| 23-20 | LAI | LAI INDEX. |
| 24 | JUMBO | EGRESS JUMBO CHECK FLAG. |
| 25 | DON'T FRAG | DON'T FRAGMENT FLAG. |
| 26 | IF TYPE | INGRESS INTERFACE TYPE. 0 = ETHERNET, 1 = POS INTERFACE. |
| 27 | - | RESERVED. |
| 28 | ROUTE | ROUTE FLAG. |
| 29 | RED | RANDOM EARLY DROP. |
| 31-30 | CTL | AFH FORMAT TYPE. |
| 51-32 | TXMI | TRANSMIT MODIFICATION INDEX. |
| 58-52 | CQoS | CPU QUEUE SELECT. |
| 59 | CPU COPY | CPU COPY FLAG. |
| 60 | REDIRECT | REDIRECT FLAG. |
| 61 | SSAMPLE | STATISTICAL SAMPLE FLAG. |
| 62 | LEARN | LEARN FLAG. REQUESTS OT TO SEND A COPY OF THE PACKET TO THE CPU FOR LEARN PROCESSING. |
| 63 | EMIRROR | EGRESS MIRROR. |
| 75-64 | IQoS | INGRESS QUEUE SELECT. |
| 78-76 | EMRK SEL | EGRESS MARK SELECT. |
| 81-79 | EMRK MASK | EGRESS MARK MASK. |
| 82 | IMIRROR | INGRESS MIRROR. |
| 83 | PERR KILL | PARITY ERROR KILL. |

FIGURE 2

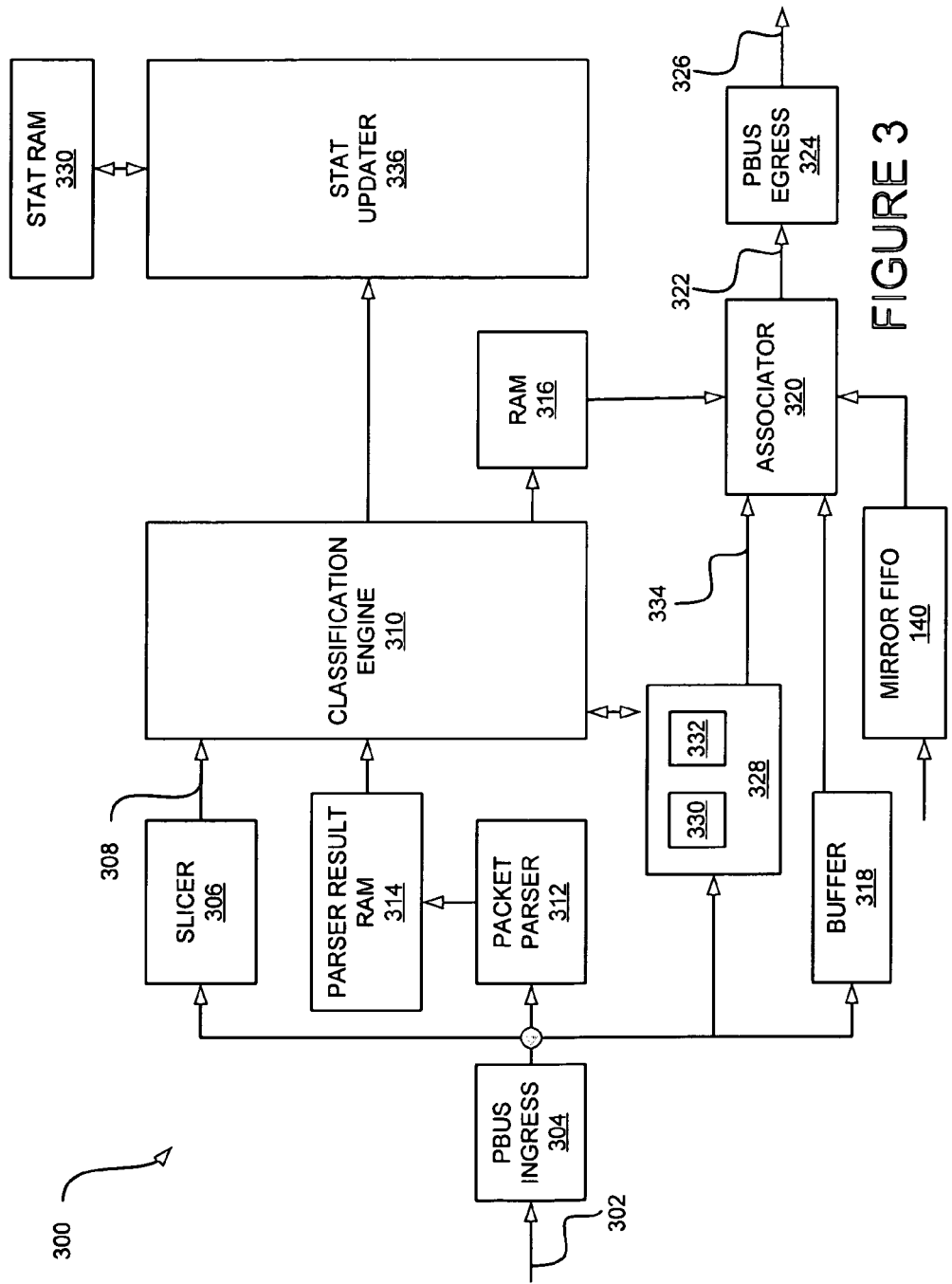

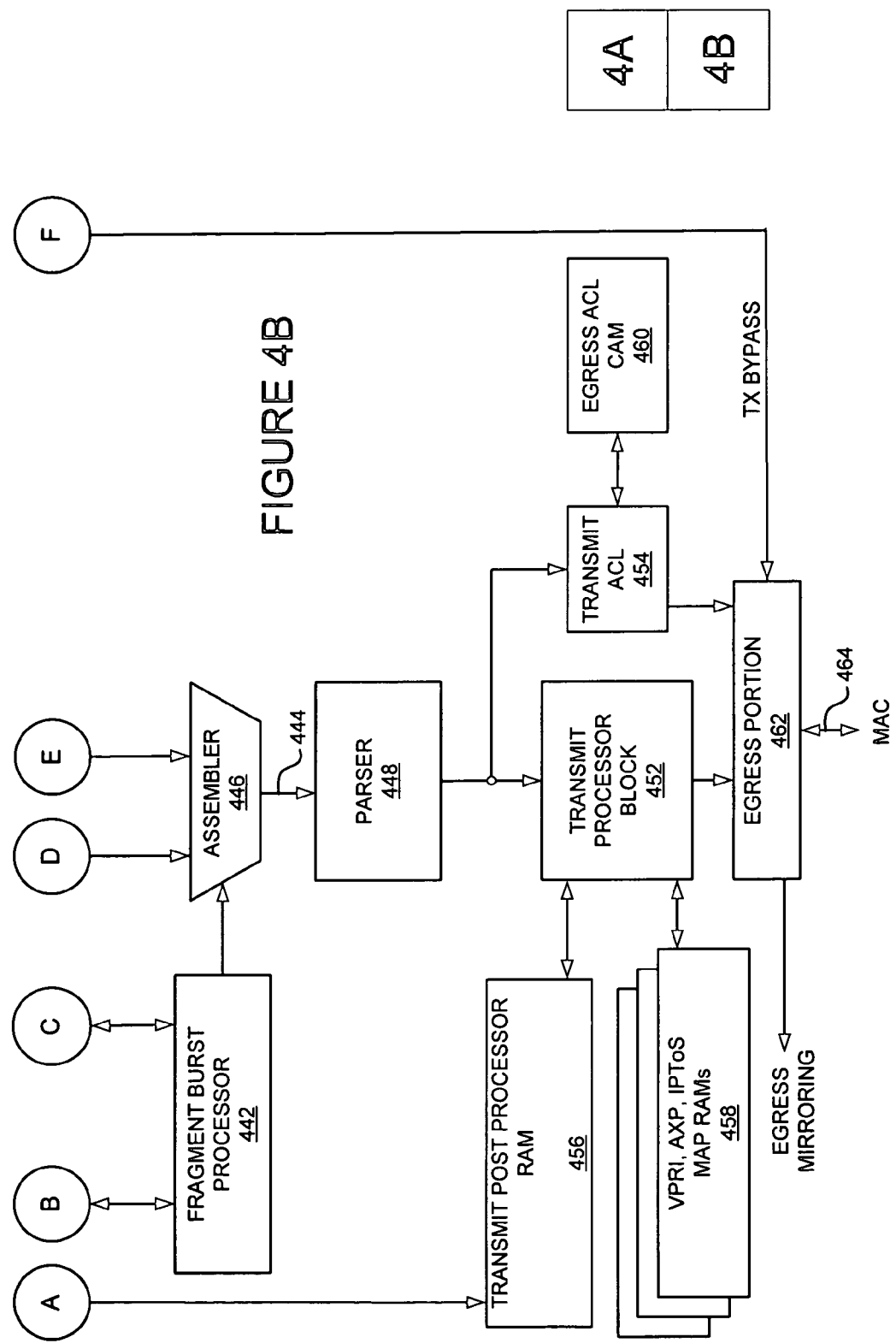

PACKET PROCESSING SYSTEM ARCHITECTURE AND METHOD

FIELD OF THE INVENTION

This invention relates to the field of packet processing, and more specifically, packet classification or modification.

RELATED ART

Current packet processing architectures are under increasing pressure to handle higher and higher data throughputs of, e.g., 10 GB/s or more, and more complex and diverse data packet formats, e.g., embedded packet formats. However, these architectures are subject to various bottlenecks and constraints which limit the data throughput which is achievable and the packet formats which can be handled with these architectures. Hence, there is a need for a packet processing architecture which overcomes the problems of the prior art.

SUMMARY OF THE INVENTION

A first aspect of the invention involves providing a plurality of quality of service indicators for a packet, each with an assigned priority, and utilizing a configurable priority resolution scheme to select one of the plurality of quality of service indicators for assigning to the packet. The plurality of quality of service indicators, and associated priorities, may each originate from different sources. In one embodiment, a mapping process is employed to map one or more fields of the packet into one or more quality of service indicators and associated priorities. In a second embodiment, a searching process is employed to locate one or more quality of service indicators and associated priorities. In a third embodiment, a combination of the foregoing approaches is employed. The priorities associated with the quality of service indicators may vary based on user or traffic type.

A second aspect of the invention involves the utilization of a wide data path in one or more selected areas of the packet processing system where the resultant high throughput is needed, while avoiding universal utilization of the wide data path and the associated high cost.

In one embodiment, a packet classification system comprises a slicer for slicing all or some of a packet into portions and providing the portions in parallel over a first data path having a first width to a classification engine. The classification engine is configured to classify the packet responsive to the packet portions provided over the first data path. The packet classification system is configured to associate data representative of the packet classification with the packet to form an associated packet, and provide the same over a second data path having a second width less than the first width.

In a second embodiment, a packet modification system comprises a buffer for providing all or some of a packet as portions and providing the portions in parallel over a first data path having a first width to a modification engine. The modification engine is configured to modify the packet, or one or more packet portions, to form a modified packet. The packet modification system is configured to provide the modified packet over a second data path having a second width less than the first width.

A third aspect of the invention involves the utilization of one or more stacks to control packet processing. In one embodiment, a packet classification system is configured to maintain a first stack which identifies packets which are waiting to be classified by the packet classification system, and a second stack which identifies packets which are in the process of being classified by the packet classification system. When a packet is received by the packet classification system, an identifier of the packet is placed on the first stack. When the packet classification system begins the process of classifying the packet, the packet identifier is popped off the first stack and placed on the second stack. When the packet classification system has completed the process of classifying the packet, the packet identifier is popped off the second stack. The packet classification system is thereafter free to output the packet. Until then, the packet classification system is prevented from outputting the packet.

A fourth aspect of the invention involves allocating a packet size determiner to a packet from a pool of packet size determiners. The packet size determiner is configured to determine the size of the packet. Once the packet size determiner has determined the size of the packet, the packet size determiner may be returned to the pool, and the determined size of the packet used to update one or more packet statistics maintained by the system. In one embodiment, cumulative size statistics are maintained, indicating the cumulative size of those packets which fulfill certain processing conditions or hits. In this embodiment, once the size of a packet has been determined, the cumulative size statistic for a particular processing condition or hit is incremented by the size of the packet if that packet satisfies the specified processing condition or hit. In one implementation, the packet size determiners are counters.

A fifth aspect of the invention involves buffering a packet upon ingress thereof to the system, processing the packet, and forming a packet for egress from the system by combining one or more unmodified portions of the packet as retrieved directly from the buffer with modified or new packet data.

In one embodiment, a packet is buffered in a buffer upon or after entry thereof into a packet classification system. The packet is classified and data representative of the packet classification provided. Some or all of the packet, as retrieved directly from the buffer, is associated with the packet classification data to form an associated packet that is placed on an egress data path of the system.

In a second embodiment, a packet is buffered in a buffer upon or after entry thereof into the packet modification system. The packet, or one or more portions thereof, is modified. One or more unmodified portions of the packet, as retrieved directly from the buffer, are associated with one or more modified portions of the packet to form an associated packet that is placed on an egress data path of the system.

A sixth aspect of the invention involves a system for preventing re-ordering of packets in a packet processing system. In one embodiment, a packet is assigned a sequence number upon or after ingress thereof to the system. The packet is processed and data representative of the packet placed in a buffer. An expected sequence number for the next packet to be output by the system is maintained, and the buffer checked for this expected sequence number. If a match is found, the packet corresponding to the match is output from the system. Otherwise, the system waits until a match is found.

A seventh aspect of the invention involves any combination of two or more of the foregoing.

Related methods are also provided. Other systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2 illustrates an example of the format of a packet header as produced by an embodiment of a packet classification system in a packet processing system.

FIG. 3 is a block diagram of an embodiment of a receive-side packet classification system.

FIGS. 4A-4B is a block diagram of an embodiment of a transmit-side packet modification system.

RELATED APPLICATIONS

Figure 1:
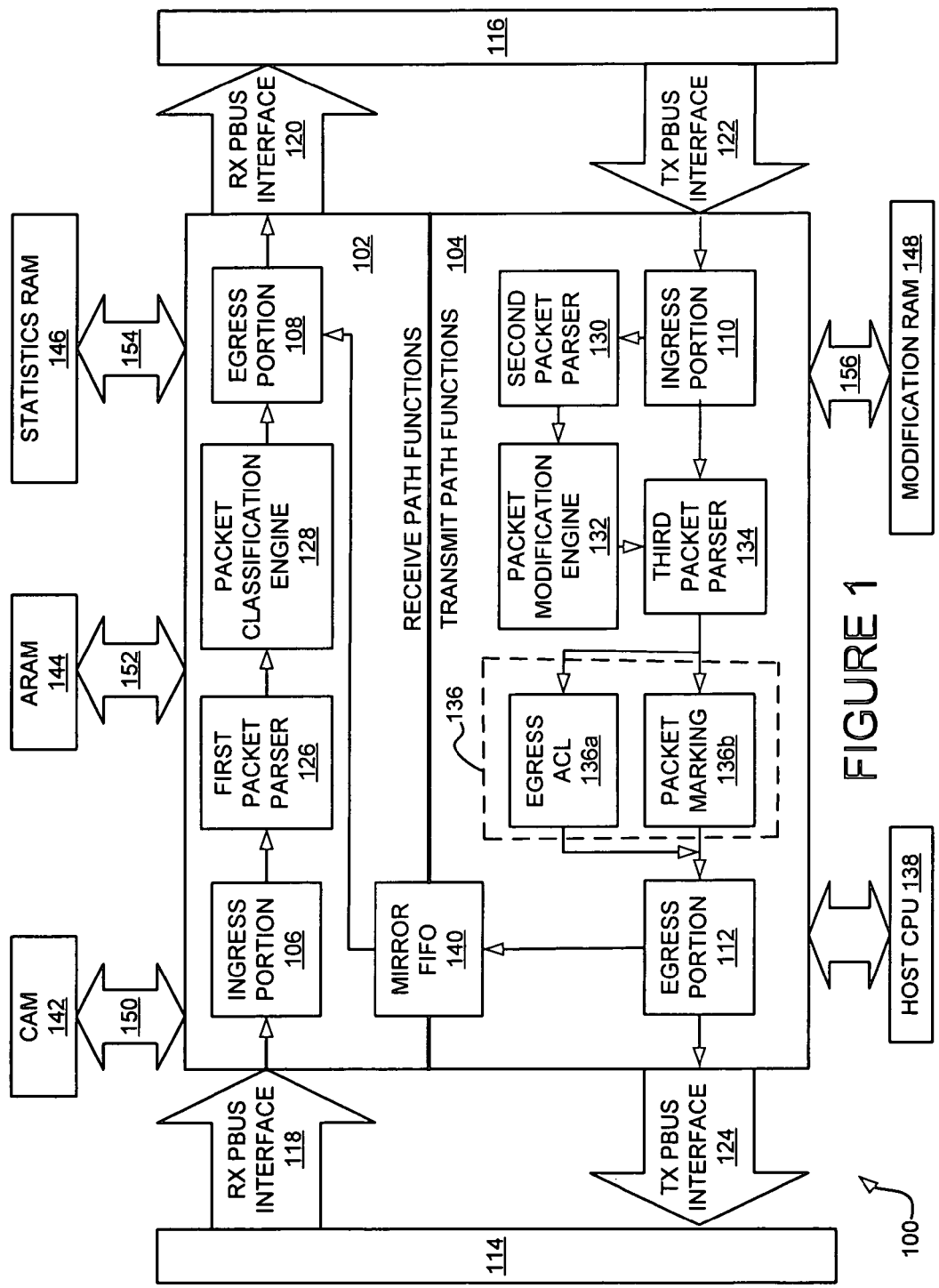
FIG. 1 is a block diagram of an embodiment of a packet processing system which comprises a receive-side packet classification system and a transmit-side packet modification system.

The following applications are commonly owned by the assignee hereof, are being filed on even date herewith, and are each incorporated by reference herein as though set forth in full:

| Howrey Dkt. No. | Extreme Dkt. No. | Title |
| --- | --- | --- |
| 02453.0025.NPUS00 | P111 | PACKET PROCESSING SYSTEM ARCHITECTURE AND METHOD |
| 02453.0026.NPUS00 | P122 | PACKET DATA MODIFICATION PROCESSOR |
| 02453.0027.NPUS00 | P124 | SYSTEM AND METHOD FOR PACKET PROCESSOR STATUS MONITORING |
| 02453.0028.NPUS00 | P126 | METHOD AND SYSTEM FOR INCREMENTALLY UPDATING A CHECKSUM IN A NETWORK DATA PACKET |
| 02453.0029.NPUS00 | P127 | SYSTEM AND METHOD FOR EGRESS PACKET MARKING |
| 02453.0030.NPUS00 | P128 | SYSTEM AND METHOD FOR ASSEMBLING A DATA PACKET |
| 02453.0032.NPUS00 | P125 | PACKET DATA MODIFICATION PROCESSOR COMMAND INSTRUCTION SET |
| 02453.0033.NPUS00 | P123 | DATA STRUCTURES FOR SUPPORTING PACKET DATA MODIFICATION OPERATIONS |
| 02453.0043.PZUS00 | P156 | RECEIVE-SIDE PACKET PROCESSING SYSTEM |

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the terms "software" or "instructions" or "commands" include source code, assembly language code, binary code, firmware, macro-instructions, micro-instructions, or the like, or any combination of two or more of the foregoing.

The term "memory" refers to any processor-readable physical or logical medium, including but not limited to RAM, ROM, EPROM, PROM, EEPROM, disk, floppy disk, hard disk, CD-ROM, DVD, queue, FIFO or the like, or any combination of two or more of the foregoing, on which may be stored one or more instructions or commands executable by a processor, data, or packets in whole or in part.

The terms "processor" or "CPU" or "engine" refer to any device capable of executing one or more commands or instructions and includes, without limitation, a general- or special-purpose microprocessor, finite state machine, controller, computer, digital signal processor (DSP), or the like.

The term "logic" refers to implementations in hardware, software, or combinations of hardware and software.

The term "stack" may be implemented through a first-in-first-out memory such as a FIFO.

The term "packet" means (1) a group of binary digits including data and control elements which is switched and transmitted as a composite whole, wherein the data and control elements and possibly error control information are arranged in a specified format; (2) a block of information that is transmitted within a single transfer operation; (3) a collection of symbols that contains addressing information and possibly error detection or correction information; (4) a sequence of characters with a specific order and format, such as destination followed by a payload; (5) a grouping of data of some finite size that is transmitted as a unit; (6) a frame; (7) the logical organization of control and data fields defined for any of the layers or sub-layers of an applicable reference model, including the OSI or TCP/IP reference models, e.g., MAC sub-layer; or (8) a unit of transmission for any of the layers or sub-layers of an applicable reference model, including the OSI or TCP/IP reference models.

The term "layer two of the OSI reference model" includes the MAC sub-layer.

The term "port" or "channel" refers to any point of ingress or egress to or from a switch or other entity, including any port channel or sub-channel, or any channel or sub-channel of a bus coupled to the port.

FIG. 1 illustrates an embodiment 100 of a packet processing system comprising a packet classification system 102 and a packet modification system 104. The packet classification system 102 has an ingress portion 106 and an egress portion 108. Similarly, the packet modification system 104 has an ingress portion 110 and an egress portion 112. The ingress portion 106 of the packet classification system 102 is coupled, through interface 118, to one or more network-side devices 114, and the egress portion 108 of the packet classification system 102 is coupled, through interface 120, to one or more switch-side devices 116. The ingress portion 110 of the packet modification system 104 is coupled, through interface 122, to the one or more switch-side devices 116, and the egress portion 124 of the packet modification system 104 is coupled, through interface 112, to the one or more network-side devices 114.

The packet classification system 102 comprises an ingress portion 106, a first packet parser 126 for parsing a packet and providing first data representative thereof, and a packet classification engine 128 for classifying the packet responsive to the first data. The packet modification system 104 comprises a second packet parser 130 for parsing the classified packet (after a round trip through the one or more switch-side devices 116) or a packet derived there-from and providing second data representative thereof, a packet modification engine 132 for modifying some or all of the packet responsive to the second data, a third packet parser 134 for parsing the modified packet and providing third data representative thereof, and a packet post-processor 136 for post-processing the modified packet responsive to the third data.

In one embodiment, the packet undergoing processing by the system has a plurality of encapsulated layers, and each of the first, second and third parsers 126, 130, 134 is configured to parse the packet by providing context pointers pointing to the start of one or more of the encapsulated layers. In a second embodiment, the packet undergoing processing by the system comprises a first packet forming the payload portion of a second packet, each of the first and second packets having a plurality of encapsulated layers, and each of the first, second and third parsers 126, 130, 134 is configured to parse the packet by providing context pointers pointing to the start of one or more of the encapsulated layers of the first packet and one or more of the encapsulated layers of the second packet.

In one implementation, the packet post-processor 136 is configured to compute a checksum for a modified packet responsive to the third data provided by parser 134. In one embodiment, the packet post-processor 136 is configured to independently calculate a layer three (IP) and layer four (TCP/UDP) checksum.

In one embodiment, packet post-processor 136 comprises Egress Access Control List (ACL) logic 136a and Packet Marking logic 136b. The Egress ACL logic 136a is configured to arrive at an ACL decision with respect to a packet. In one implementation, four ACL decisions can be independently performed: 1) default ACL action; 2) CPU copy; 3) mirror copy; and 4) kill. The default ACL action may be set to kill or allow. The CPU copy action forwards a copy of the packet to a host 138 coupled to the system. The mirror copy action implements an egress mirroring function (to be discussed in more detail later), in which a copy of the packet is forwarded to mirror FIFO 140 and then on to the egress portion 108 of the packet classification system 102. The kill action either kills the packet or marks it for killing by a downstream Medium Access Control (MAC) processor.

The Packet Marking logic 136b is configured to implement a packet egress marking function in which certain packet marking control information for a packet generated by the packet classification system 102 is used to selectively modify one or more quality of service (QoS) fields in the packet.

In one embodiment, Content Addressable Memory (CAM) 142 is used by the packet classification system 102 to perform packet searches to arrive at a classification decision for a packet. In one implementation, the CAM searches are ternary in that all entries of the CAM have a data and mask field allowing don't care setting of any bit position in the data field. In another implementation, the CAM searches are binary, or combinations of binary and ternary.

The associated RAM (ARAM) 144 provides associated data for each entry in the CAM 142. The ARAM 144 is accessed using the match address returned by the CAM 142 as a result of a search operation. The ARAM 144 entry data is used to supply intermediate classification information for the packet that is used by the classification engine 128 in making a final classification decision for the packet.

The statistics RAM 146 is used to maintain various packet statistics, including, for each CAM entry, the cumulative number and size of packets which hit or matched that entry.

The modification RAM 148 provides data and control structures for packet modification operations performed by the modification engine 132.

In one implementation, the interfaces 150, 152, 154, and 156 with any of the RAMs or CAMs may be a QDR- or DDR-type interface as described in U.S. patent application Ser. No. 10/655,742, filed Sep. 4, 2003, which is hereby fully incorporated by reference herein as though set forth in full.

FIG. 2 illustrates the format of classification data 200 for a packet as produced by one embodiment of packet classification system 102. The classification data 200 in this embodiment has first and second portions, identified respectively with numerals 202 and 204. The first portion 202 is a 64 bit Address Filtering Header (AFH) which is pre-pended to the packet. The second portion 204 is a 20 bit grouping of flags which are encoded as control bits maintained by the system 100.

In one embodiment, the Port Tag Index (PTI) field is an identifier of the port or list of ports within interface 118 over which the packet will be sent by the packet modification engine. (The assumption in this embodiment is that the interface 118 is a multi-port interface).

The Egress Quality of Service (EQoS) field may be used to perform an egress queue selection function in a device encountering the packet. In one embodiment, this field also encodes one of the following functions: nothing, pre-emptive kill, normal kill, thermonuclear kill, egress mirror copy, pre-emptive intercept to host, and normal intercept to host.

The Link Aggregation Index (LAI) field may be used to implement physical link selection, ingress alias, echo kill alias, or equal cost multi-path functions in a device encountering the packet.

The JUMBO flag, if asserted, directs a device encountering the packet to perform a JUMBO-allowed check. In one embodiment, the flag is used to implement the policy that the only valid JUMBO packets are IP packets. Therefore, if the packet is a non-IP JUMBO packet, the device either sends it to a host, fragments it, or kills it.

The DON'T FRAG flag, if asserted, directs a device encountering the packet not to fragment it in the course of implementing a JUMBO-allowed check.

The IF TYPE flag indicates whether the ingress interface over which the packet was received is an Ethernet or Packet Over Sonet (POS) interface.

The ROUTE flag, if asserted, indicates that the packet is being bridged not routed, and may be used by devices encountering the packet to implement an echo kill suppress function.

The RANDOM EARLY DROP (RED) flag may be used to implement a random early drop function in devices encountering the packet.

The CTL flag indicates the format of the AFH. FIG. 2 illustrates the format of the header for packets exiting the packet classification system 102 and destined for the one or more switch-side devices 116. Another format applies for packets exiting the one or more switch-side devices 116 and destined for the packet modification system 104. The CTL flag indicates which of these two formats is applicable.

The Transmit Modification Index (TXMI) field is used by the modification engine 132 to retrieve control and data structures from Modification RAM 148 for use in performing any necessary modifications to the packet.

The CPU Quality of Service (CQoS) field may be used to perform an ingress queue select function in a host coupled to the packet processing system.

In one embodiment, the CPU Copy flag, if asserted, directs one or more of the switch-side devices 116 to forward a copy of the packet to a host coupled to the packet processing system. In another embodiment, the CPU Copy flag, if asserted, directs a copy of a packet to be forwarded to the host through a host bus or another PBUS.

The Redirect flag, if asserted, directs one or more of the switch-side devices 116 to forward a copy of the packet to the host for redirect processing. In redirect processing, the host receives the packet copy and redirects it to the sender, with an indication that the sender should switch the packet, not route it.

The Statistical Sample (SSAMPLE) flag, if asserted, indicates to one or more of the switch-side devices 116 that the packet is a candidate for statistical sampling. If the packet is ultimately selected for statistical sampling, a copy of the packet is directed to the host, which performs a statistical analysis of the packet for the purpose of accurately characterizing the network traffic of which the packet is a part.

The LEARN flag, if asserted, directs one or more of the switch-side devices 116 to forward a copy of the packet to the host so the host can perform learn processing. In learn processing, the host analyzes the packet to "learn" the sender's MAC address for future packet switching of packets to that address.

The Egress Mirror (EMIRROR) flag, if asserted, implements egress mirroring by directing one or more of the switch-side devices 116 to send a copy of the packet to mirror FIFO 140. From mirror FIFO 140, the packet passes through the egress portion 108 of the packet classification system 102 en route to the one or more switch-side devices 116.

The Ingress Quality of Service (IQoS) field may be used to perform an ingress queue selection function in a device encountering the packet.

The Egress Mark Select (EMRK SEL) field selects one of several possible egress mark functions. The Egress Mask (EMRK MASK) field selects one of several possible egress masks. Together, the EMRK SEL and EMRK MASK fields forms an embodiment of packet egress marking control information which may be used by packet marking logic 136b to mark the packet, i.e., selectively modify one or more QoS fields within the packet.

The Ingress Mirror (IMIRROR) flag, if asserted, directs one or more of the switch-side devices 116 to forward a copy of the packet to the designated ingress mirror port on the switch.

The Parity Error Kill (PERR KILL) flag, if asserted, directs the interface 120 to kill the packet due to detection of an ARAM parity error.

In one embodiment, the EMIRROR bit is normally in an unasserted state. If the packet classification system 102, after analyzing the packet, determines that egress mirroring of the packet is appropriate, the packet classification system 102 changes the state of the EMIRROR bit to place it in the asserted state.

The packet, along with a pre-pended AFH containing the EMIRROR bit, is then forwarded to the one or more switch-side devices 116. After processing the packet, the one or more devices transmit the packet, with the EMIRROR bit preserved in a pre-pended packet header, back to the packet modification system 104 over interface 122. In response, the packet modification system 104 is configured to detect the state of the EMIRROR bit to determine if egress mirroring of the modified packet is activated, and if so, provide a copy of the modified packet to the egress portion 108 of the packet classification system 102 through the mirror FIFO 140.

In one embodiment, the EQoS, CQoS, IQoS, EMRK SEL and EMRK MASK fields define a multi-dimensional quality of service indicator for the packet. In this embodiment, the EMRK SEL and EMRK MASK fields form packet egress marking control information which is utilized by packet modification system 104 to selectively modify one or more quality of service fields within the packet, or a packet derived there-from.

The quality of service indicator for a packet may be derived from a plurality of candidate quality of service indicators derived from diverse sources. In one embodiment, a plurality of candidate quality of service indicators are derived for a packet, each with an assigned priority, and a configurable priority resolution scheme is utilized to select one of the plurality of quality of service indicators for assigning to the packet. In one embodiment, one or more of the candidate quality of service indicators, and associated priorities, are derived by mapping one or more fields of the packet into one or more candidate quality of service indicators for the packet and associated priorities. In a second embodiment, one or more searches are conducted to obtain one or more candidate quality of service indicators for the packet and associated priorities. In a third embodiment, a combination of these two approaches is utilized.

In one example, candidate quality of service indicators, and associated priorities, are derived from three sources. The first is a VLAN mapping scheme in which a VLAN from the packet is mapped into a candidate quality of service indicator and associated priority using a VLAN state table (VST). The VLAN from the packet may represent a subnet or traffic type, and the associated priority may vary based on the subnet or traffic type. The second is a CAM-based search which yields an associated ARAM entry which in turn yields a candidate quality of service indicator. A field of an entry in a Sequence Control Table (SCT) RAM, which provides the sequence of commands controlling the operation of one embodiment of the packet classification engine 102, provides the associated priority. The third is a QoS mapping scheme, which operates in one of three modes, as determined by a field in a SCT RAM entry.

In the first mode, the 0.1p mapping mode, the VST provides the four QSEGment bits. The QSEG and the 0.1p bits are mapped into a candidate quality of service indicator, and the VLAN itself is mapped into an associated priority using the VST. In the second mode, the MPLS mapping mode, the EXP/QOS fields from the packet are mapped into a candidate quality of service indicator, and a VLAN from the packet is mapped into the associated priority using the VST. In the third mode, the ToS mapping mode, the IPv4ToS, IPv6 Traffic Class, or Ipv6 Flow Label based QoS fields are mapped into a candidate quality of service indicator, and a VLAN from the packet is mapped into an associated priority using the VST.

In this example, the candidate quality of service indicator with the highest priority is assigned to the packet. Moreover, a candidate from one of the sources can be established as the default, which may be overridden by a candidate obtained from one of the other sources, at least a candidate which has a higher priority than the default selection. For example, the candidate quality of service indicator resulting from the 0.1p mapping mode can be established as the default selection, and this default overridden only by a candidate quality of service indicator resulting from an ARAM entry in turn resulting from a CAM-based search.

FIG. 3 illustrates an embodiment 300 of a packet classification system. In this embodiment, the packet classification system is coupled to one or more network-side devices through a multi-port packet bus (PBUS) 302, as described in U.S. patent application Ser. Nos. 10/405,960 and 10/405,961, filed Apr. 1, 2003, which are both hereby fully incorporated herein by reference. PBUS ingress logic 304 is configured to detect a start of packet (SOP) condition for packets arriving at the packet classification system over the PBUS.

Upon or after detection of the SOP condition, the packet, or a portion thereof, is stored in slicer 306. Slicer 306 is configured to slice some or all of a packet into portions and provide the portions in parallel over first data path 308 having a first width to classification engine 310. In one embodiment, the slicer 306 is a FIFO which stores the first 128 bytes of a packet (or the entirety of the packet if less than 128 bytes), and provides the 1024 bits thereof in parallel to the packet classification engine 310 over the first data path 308.

Upon or after detection of the SOP condition, parser 312 parses the packet in the manner described previously, and stores the resultant context pointers (and other flags resulting from the parsing process) in parser result RAM 314. Concurrently with this parsing process, the packet is stored in buffer 318, which in one embodiment, is a FIFO buffer.

The packet classification engine 310 is configured to classify the packet responsive to the packet portions received over the first data path 308 and the parser results as stored in the parser result RAM 314, and store data representative of the packet classification in classification RAM 316. In one embodiment, the classification data is the AF header illustrated in FIG. 2.

An associator 320 is configured to associate the data representative of the packet classification with some or all of the packet, and provide the associated packet over a second data path 322 having a second width less than the first width.

The packet classification system is coupled to one or more switch-side devices over a multi-port PBUS 326, and PBUS egress logic 324 is configured to transmit the associated packet over the PBUS 326.

In one embodiment, slicer 306 comprises a plurality of memories configured to store some or all of the packet, and provide the portions thereof in parallel over the first data path 308 to the classification engine 310. In one example, the slicer 306 is configured as eight (8) memories configured to provide the first 1024 bits of the bits of the packet (or less if the packet is less than 128 bytes) in parallel over the first data path 308 to classification engine 310.

In one embodiment, the associator 320 comprises a multiplexor configured to multiplex onto the second data path 322 the data representative of the packet classification as stored in classification RAM 316 and some or all of the packet as stored in buffer 318. In one implementation, the multiplexor multiplexes the first 8 byte portion 202 of the AF data illustrated in FIG. 2 (which may be referred to as the AF header) onto the second data path followed by the packet as stored in buffer 318, thereby effectively pre-pending the AF header to the packet. In this implementation, control logic 328 controls the operation of the multiplexor through one or more signals provided over control data path 334.

More specifically, the multiplexor in this implementation is configured to select one of three inputs and output the selected input to the second data path 322 under the control of the control logic 328. The first input is the classification data as stored in classification RAM 316. The second input is the packet as stored in buffer 318. The third input is the output of the mirror FIFO 140. This third input is selected when the egress mirroring function, discussed previously, is activated.

In one embodiment, the control logic 328 is also configured to maintain first and second FIFO buffers, identified respectively with numerals 330 and 332, the first FIFO buffer 330 for identifying those packets which are awaiting classification by the packet classification system, and the second FIFO buffer 332 for identifying those packets which are undergoing classification by the classification system.

In this embodiment, the control logic 328 is configured to place an identifier of a packet on the first FIFO buffer 330 upon or after receipt of the packet by the packet classification system, pop the identifier off the first FIFO buffer 330 and place it on the second FIFO buffer 332 upon or after initiation of classification processing of the packet by the packet classification system, and pop the identifier off the second FIFO buffer 332 upon or after completion of classification processing of the packet by the packet classification system.

The control logic 328 is configured to prevent the packet classification system from outputting a packet onto PBUS 326 while an identifier of the same is placed on either the first or second FIFO buffers 330, 332, and allows the packet classification system to output the packet onto PBUS 326 upon or after the identifier of the packet has been popped off the second FIFO buffer 332. In one implementation, the control logic 328 prevents the associator 320 from outputting data on the second data path 322 through one or more signals provided over control data path 334. In one implementation, the control logic 328 is a state machine.

In one embodiment, the control logic 328 forms the basis of a packet statistics maintaining system within the packet classification system. In this embodiment, the control logic 328 is configured to maintain a pool of packet size determiners, and allocate a packet size determiner to a packet from the pool upon or after receipt thereof by the packet classification system.

In one implementation, the control logic 328 allocates a packet size determiner to a packet upon or after the PBUS ingress logic 304 signals a SOP condition for the packet. The packet size determiner is configured to determine the size of the packet, and the control logic 328 is configured to return the packet size determiner to the pool upon or after the same has determined the size of the packet. In one implementation example, the packet size determiners are counters.

Statistics RAM 330 in this embodiment maintains packet statistics, and statistics update logic 336 is configured to update the packet statistics responsive to the determined size of the packet. In one implementation, the statistics update logic 336 includes a queue for queuing statistics update requests issued by the control logic 328.

In one configuration, the packet statistics maintaining system is configured to maintain packet statistics indicating the cumulative size of packets which have met specified processing conditions or hits, and the statistics update logic 336, upon or after a packet size determiner has determined the size of a packet, is configured to increment a cumulative size statistic for a particular processing condition or hit by the determined size of the packet if the packet satisfies that particular processing condition or hit. In one example, the system maintains statistics indicating the cumulative size and number of packets which have resulted in each of a plurality of ternary CAM 142 hits.

Figure 4A:
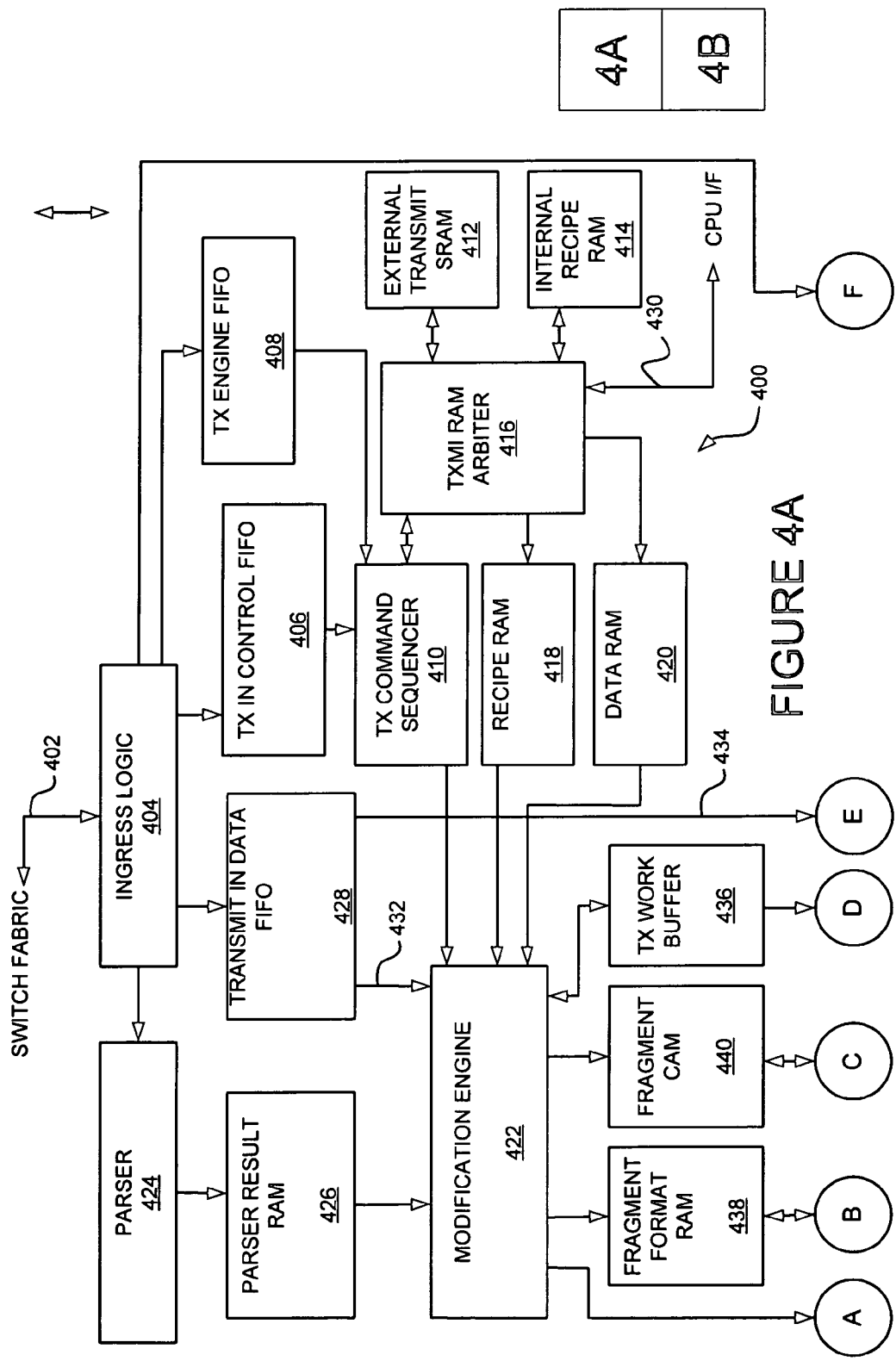

FIGS. 4A-4B illustrate an embodiment 400 of a packet modification system having PBUS ingress logic 404 which is coupled to one or more switch-side devices through PBUS 402. In this embodiment, the packets are received over the PBUS channels in bursts. The PBUS ingress logic 404 is configured to monitor the PBUS channels in a round robin fashion. When the PBUS ingress logic 404 detects a SOP condition on one of the channels, the Transmit Modification Index (TXMI) is extracted from the AF header of the packet, and it, along with the length of the initial packet burst, and an end of packet (EOP) marker if the packet length is less than or equal to the burst length, is placed on Transmit In Control FIFO 406. The packet or packet burst is stored in Transmit In Data FIFO 428, and a pointer to the start of the packet or packet burst (SOP pointer) is stored in Transmit Engine FIFO 408, along with an identifier of the PBUS channel over which the packet or packet burst was received. In one implementation, the packet bursts are 128 bytes in length.

Transmit In Data FIFO 428 stores the packet data such that portions of the packet can be passed in parallel over a first data path 402 having a first width to a modification engine 422. In one implementation, the Transmit In Data FIFO 428 comprises a plurality of FIFOs, with the outputs of the FIFOs coupled in parallel to the modification engine 422 and collectively forming the first data path 402. Incoming packet or packet bursts are copied into each of the plurality of FIFOs, thereby providing the modification engine with sliced portions of the packets or packet bursts in parallel.

The incoming packets or packet bursts are also input to the second packet parser 424, which parses the packets or packet bursts in the manner described previously. The context pointers and status bits resulting from the parsing process are stored in parser result RAM 426.

The Transmit Command Sequencer 410 is configured to read a SOP pointer and channel from the Transmit Engine FIFO 408, and utilize this information to locate the packet or packet bursts in the Transmit In Control FIFO 406. The Transmit Modification Index (TXMI) within the AF header of this packet or packet burst is then located and used to access a TXMI link in External Transmit SRAM 412, an SRAM located off-chip in relation to modification engine 422. The TXMI link may either be 1) an internal recipe link to a recipe of modification commands stored in Internal Recipe RAM 414, an on-chip RAM in relation to modification engine 422, and related data structures stored in External Transmit SRAM 412, or 2) an external recipe link to a recipe of modification commands stored in External Transmit SRAM 412 and related data structures also stored in External Transmit SRAM 412.

The sequencer 410 also assigns a sequence number to the packet to prevent packet re-ordering. It then directs the Transmit RAM arbiter 416 to read the recipe of modification commands stored in the External Transmit SRAM 412 (assuming the TXMI link is an external recipe link) or Internal Recipe RAM 414 (assuming the TXMI link is an internal recipe link) and store the same in Recipe RAM 418, an on-chip RAM in relation to modification engine 422. It further directs the arbiter 416 to read the data structures associated with the specified internal or external recipe command sequence, and store the same in Data RAM 420, another on-chip RAM in relation to modification engine 422.

The sequencer 410 then awaits an available slot in the pipeline of the modification engine 422. When such is available, the sequencer 410 passes to the engine 422 for placement in the slot a pointer to the recipe as stored in Recipe RAM 418 and other related information.

The sequencer 410 assigns a fragment buffer to the packet. The fragment buffer is a buffer within a plurality of fragment buffers which collectively may be referred to as TX work buffer 436. The modification engine then executes the recipe for the packet or packet burst, through one or more passes through the modification engine pipeline. In one embodiment, the recipe comprises one or more entries, and one or more passes through the pipeline are performed to execute each entry of the recipe.

In the process of executing the recipe, the modification engine 422 stores the modified fragments of the packet in the fragment buffer allocated to the packet in TX work buffer 436. At the same time, the modification engine 422 stores, in ascending order in fragment format RAM 438, pointers to the modified fragments of the packet as stored in the fragment buffer and pointers to the unmodified fragments of the packet as stored in Transmit In Data FIFO 428.

When all the recipe entries have been executed, the modification engine 422 writes an entry to the fragment CAM 440, the entry comprising the PBUS channel over which the packet was received, the sequence number for the packet, the SOP pointer to the packet (as stored in the Transmit In Data FIFO 428), a packet to be killed flag, a packet offset in the Transmit In Data FIFO 428, and the total length of the list of fragments as stored in the fragment format RAM 438. This completes the processing of the packet by the modification engine 422.

Fragment/burst processor 442 assembles the packets for ultimate egress from the system. To prevent packet reordering, the fragment/burst processor 442 processes, for each PBUS channel, the packets in the order in which they were received by the modification system 400. More specifically, the fragment(burst processor 442 maintains an expected next sequence number for each PBUS channel, and then performs, in round robin fashion, CAM searches in fragment CAM 440 for an entry bearing the expected next sequence number for the channel. If an entry is found with that sequence number, the fragment/burst processor 442 processes it. If such an entry is not found, the fragment/burst processor 442 takes no action with respect to the channel at that time, and proceeds to process the next channel.

When a fragment CAM entry with the expected next sequence number is located, the fragment/burst processor 442 directs assembler 446 to assemble the packet responsive to the fragment list for the packet as stored in the fragment format RAM 438. In one embodiment, the assembler 446 is a multiplexor, which is directed to multiplex between outputting on second data path 444, responsive to the fragment list, the modified packet fragments as stored in the TX work buffer 436 and the unmodified packet fragments as stored in the Transmit In Data FIFO 428 (as provided to the multiplexor 446 over data path 434). Through this process, the packet is assembled in ascending order on second data path 444. In one embodiment, the second data path 444 has a width less than the width of the first data path 402. In one implementation, the fragment/burst processor 442 outputs the packets over data path 444 in the form of bursts.

The assembled packet is parsed by the third packet parser 448 in the manner described previously. The resultant context pointers and status flags are then passed, along with the packet, for concurrent processing by Transmit Processor Block 452 and Transmit ACL Logic 454.

The Transmit Processor Block 452 performs two main functions. First, it performs egress mark processing by selectively modifying one or more QoS fields in the packet responsive to the egress mark control information from the packet stored by the modification engine in Transmit Post Processor RAM 456. In one example, any of the VLAN VPRI, MPLS EXP, and IPv4/IPv6 TOS fields may be modified through this process utilizing the VPRI/EXP/IP-ToS RAMs 458 as appropriate. The egress mark control information may be derived from one or more egress mark commands specified by an AFH pre-pended to the packet, or from one or more egress mark commands within a recipe for the packet. Second, it performs OSI Layer 3/Layer 4 checksum calculation or modification.

The Transmit ACL logic 454 conducts a CAM search for the packet in Egress ACL CAM 460 to determine if the packet should be killed, a copy sent to the host, or mirrored to the egress mirror FIFO 140. The packet then exits the packet modification system 400 through the egress portion 462 of the system 400, and is output onto PBUS 464.

Figure 5:
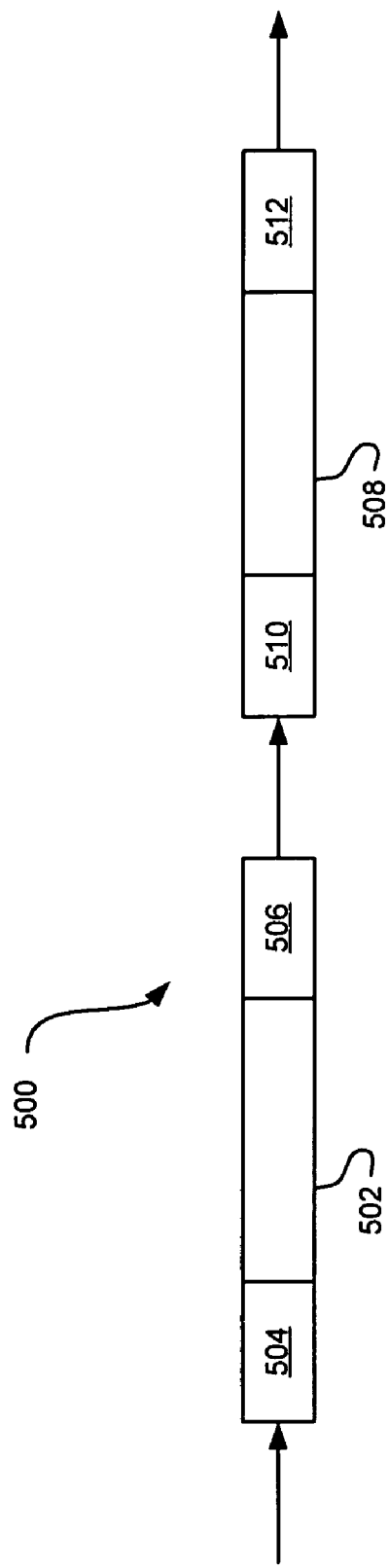
FIG. 5 is a block diagram of an embodiment of a cascade of multiple packet processing systems.

FIG. 5 illustrates a cascaded combination 500 of multiple, replicated packet systems, each of which is either a packet classification system or a packet modification system. In one embodiment, the cascaded combination comprises a first one 502 of the replicated packet systems having ingress and egress portions, identified respectively with numerals 504 and 506, and a second one 508 of the replicated packet systems having ingress and egress portions, identified respectively with numerals 510 and 512.

In this embodiment, the egress portion 506 of the first packet system 502 is coupled to the ingress portion 510 of the second packet system 508. Moreover, the first one 502 of the replicated packet systems is configured to perform partial processing of a packet, either classification or modification processing as the case may be, and the second one 508 of the replicated packet systems is configured to complete processing of the packet.

In one configuration, packet system 508 forms the last one of a plurality of systems in the cascaded combination, and packet system 502 forms either the first or the next to last one of the systems in the cascaded combination.

In one example, each of the replicated systems performs a limited number of processing cycles, and the number of replicated systems is chosen to increase the number of processing cycles to a desired level beyond that achievable with a single system.

In a second example, a complete set of processing functions or tasks is allocated amongst the replicated systems. In one configuration, a first replicated system is allocated ACL and QoS classification processing tasks, and a second replicated system is allocated PTI/TXMI classification processing tasks.

Figure 6:
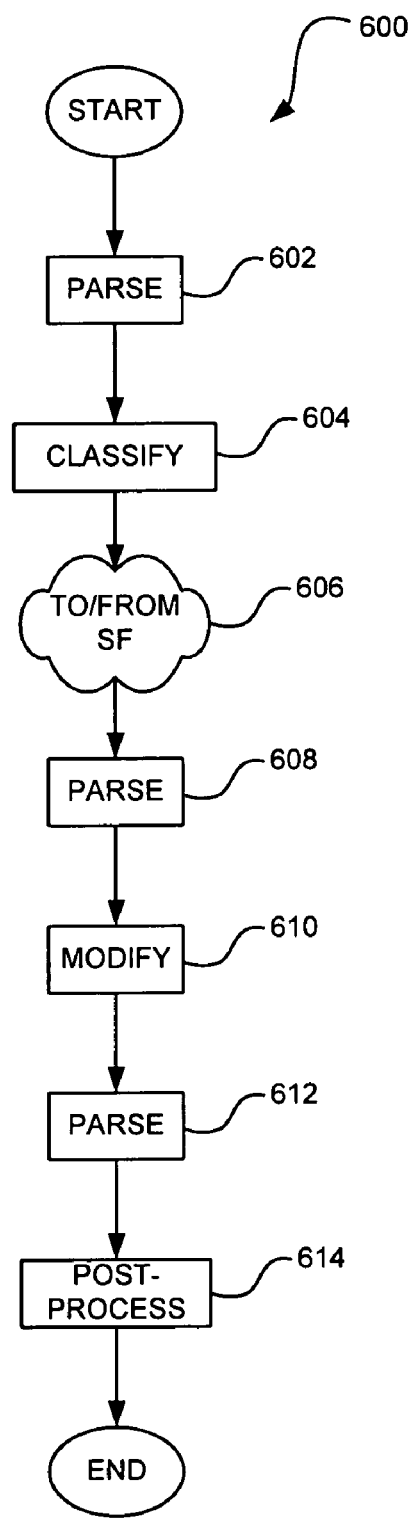
FIG. 6 is a flowchart of an embodiment of method of processing a packet which comprises multiple parsing steps.

FIG. 6 is a flowchart of one embodiment 600 of a method of processing a packet. In this embodiment, the method comprises step 602, parsing a packet and providing first data representative thereof, and step 604, classifying the packet responsive to the first data.

In step 606, the packet is forwarded to and received from switching fabric, which may perform additional processing of the packet. Step 608 comprises parsing the packet received from the switching fabric (which may be the packet forwarded to the switching fabric, or a packet derived there-from), and providing second data representative thereof.

Step 610 comprises modifying the packet responsive to the second data, and step 612 comprises parsing the modified packet and providing third data representative thereof. Step 614 comprises post-processing the modified packet responsive to the third data.

In one embodiment, the packet undergoing processing has a plurality of encapsulation layers, and each of the first, second and third parsing steps 602, 608, 612 comprising providing context pointers pointing to the start of one or more of the encapsulated layers of the packet.

In a second embodiment, the packet undergoing processing comprises a first packet forming the payload portion of a second packet, each of the first and second packets having a plurality of encapsulation layers, and each of the first, second and third parsing steps 602, 608, 612 comprises providing context pointers pointing to the start of one or more of the encapsulated layers of the first packet and one or more of the encapsulated layers of the second packet.

In one implementation, the post-processing step comprises computing a checksum for the modified packet. In a second implementation, the post-processing step comprises egress marking of the packet. In a third implementation, the post-processing step comprises the combination of the foregoing two implementations.

Figure 7:
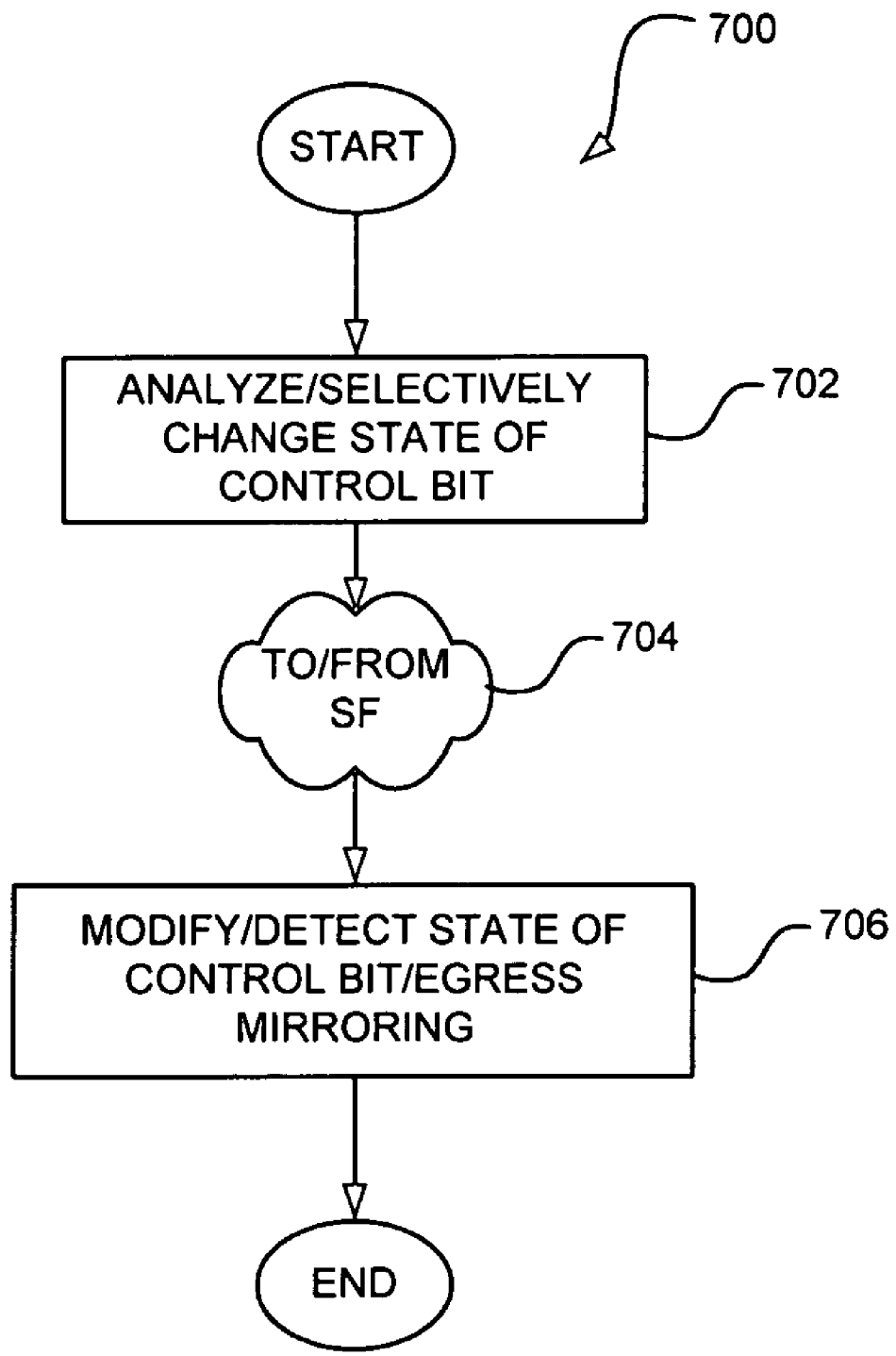
FIG. 7 is a flowchart of an embodiment of a method of performing egress mirroring of a packet.

FIG. 7 is a flowchart of a second embodiment 700 of a method of processing a packet. In this embodiment, step 702 comprises analyzing a packet in a packet classification system and, responsive thereto, selectively changing the state of a control bit from a first state to a second state. Step 704 comprises forwarding the packet to and from switching fabric. Step 706 comprises modifying, in a packet modification system, the packet received from the switching fabric (either the packet forwarded to the switching fabric, or a packet derived there-from), detecting the control bit to determine if egress mirroring of the modified packet is activated, and if so, providing a copy of the modified packet to the packet classification system.

In one implementation, the control bit is associated with the packet received from the switching fabric. In one example, the control bit is in a packet header pre-pended to the packet received from the switching fabric.

Figure 8:
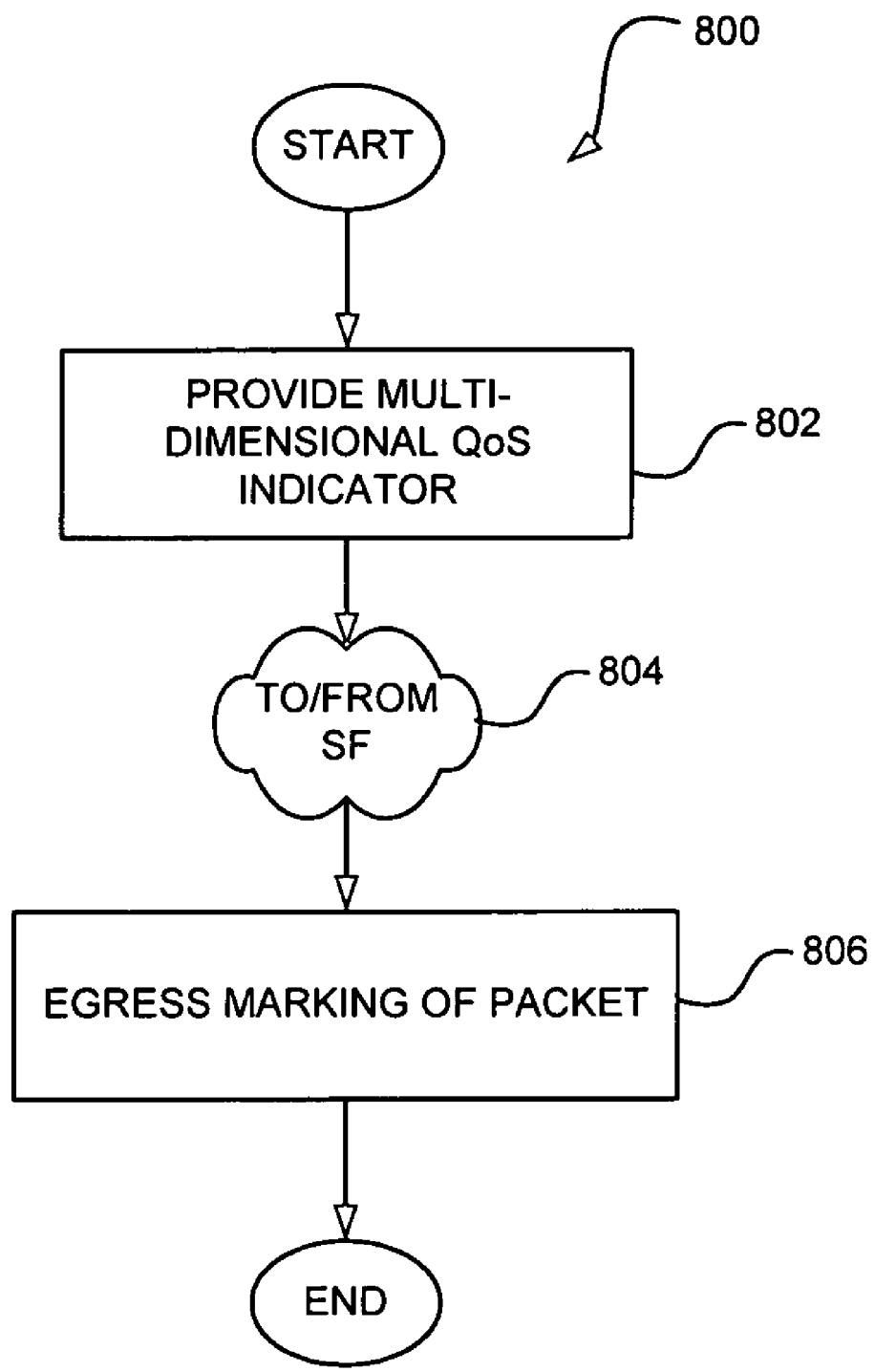
FIG. 8 is a flowchart of an embodiment of a method of performing egress marking of a packet.

FIG. 8 is a flowchart of a third embodiment 800 of a method of processing a packet. Step 802 comprises providing a multi-dimensional quality of service (QoS) indicator for a packet. Step 804 comprises forwarding the packet to and from switching fabric. Step 806 comprises egress marking of the packet received from the switching fabric (either the packet forwarded to the switching fabric, or a packet derived there-from), responsive to at least a portion of the multi-dimensional QoS indicator.

In one implementation, step 806 comprises selectively modifying one or more quality of service fields within the packet received from the switching fabric responsive to at least a portion of the multi-dimensional quality of service indicator.

In one configuration, the multi-dimensional quality of service indicator comprises an ingress quality of service indicator, an egress quality of service indicator, and packet marking control information, and step 806 comprises selectively modifying one or more quality of service fields within the packet received from the switching fabric responsive to the packet marking control information. In one example, the multi-dimensional quality of service indicator further comprises a host quality of service indicator.

In one embodiment, the method further comprises utilizing the ingress quality of service indicator as an ingress queue select. In a second embodiment, the method further comprises utilizing the egress quality of service indicator as an egress queue select. In a third embodiment, the method further comprises utilizing the host quality of service indicator as an ingress queue select for a host.

Figure 9:
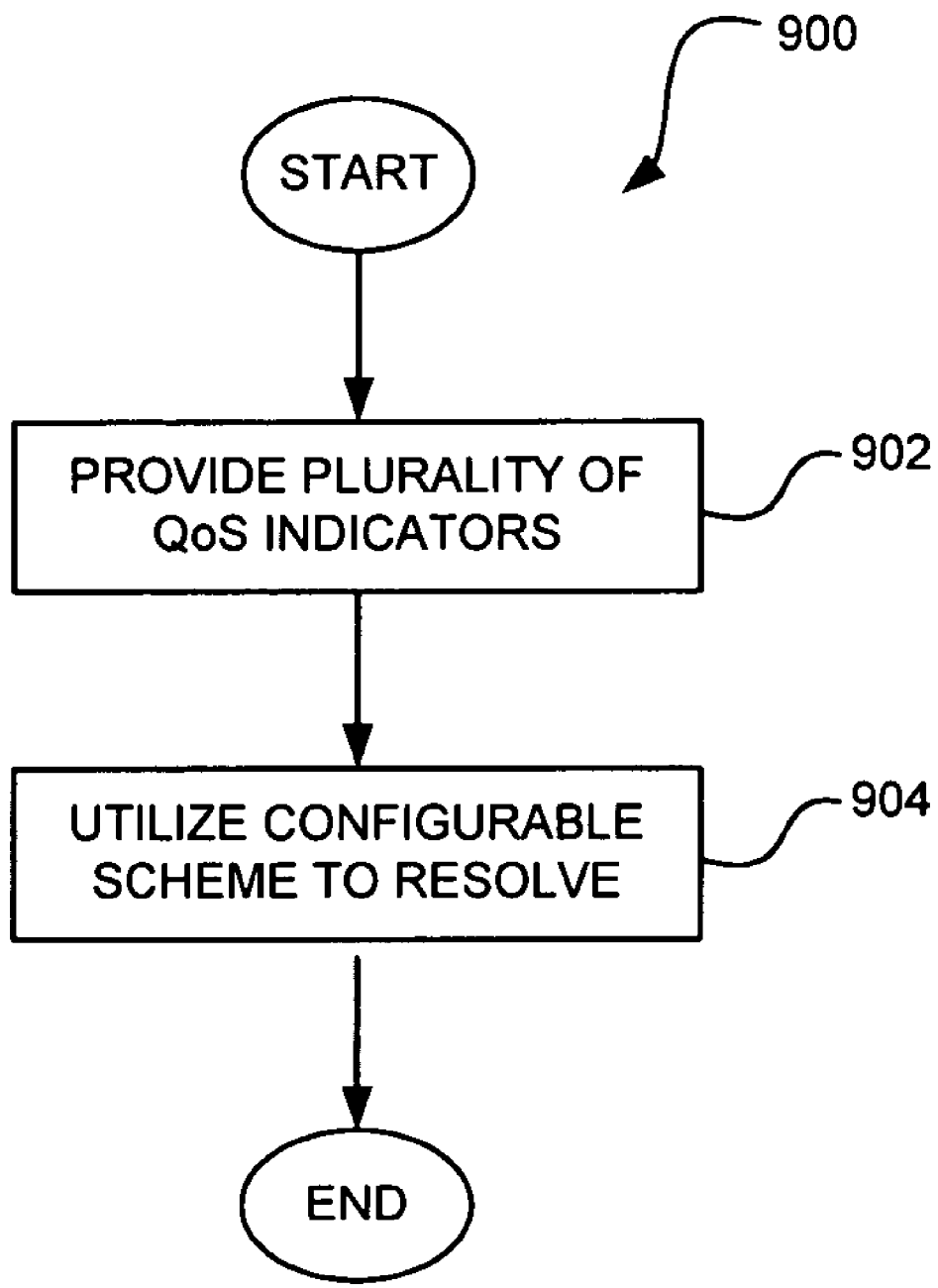
FIG. 9 is a flowchart of an embodiment of a method of resolving a plurality of quality of service (QoS) indicators for a packet utilizing a configurable priority resolution scheme.

FIG. 9 is a flowchart of an embodiment 900 of assigning a quality of service indicator to a packet. In this embodiment, step 902 comprises providing a plurality of quality of service indicators for a packet, each with an assigned priority, and step 904 comprises utilizing a configurable priority resolution scheme to select one of the plurality of quality of service indicators for assigning to the packet.

In one implementation, step 902 comprises mapping one or more fields of the packet into a quality of service indicator for the packet and an associated priority. In a second implementation, step 902 comprises performing a search to obtain a quality of service indicator for the packet and an associated priority. A third implementation comprises a combination of the foregoing two implementations.

Figure 10:
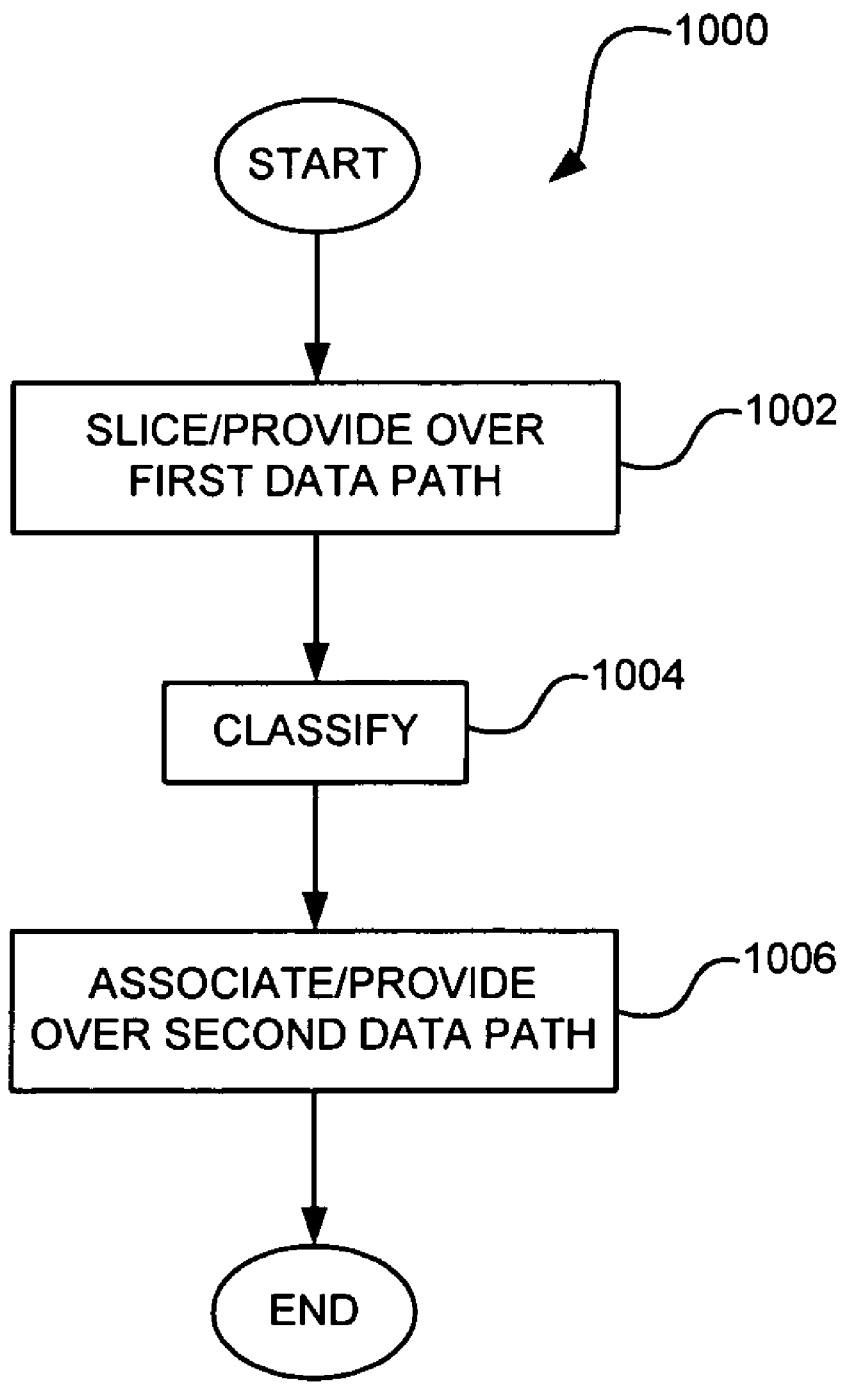
FIG. 10 is a flowchart of an embodiment of a method of classifying a packet in which sliced packet data is provided to a packet classification engine over a wide data path.

FIG. 10 is a flowchart of an embodiment 1000 of a method of classifying a packet. In this embodiment, step 1002 comprises slicing some or all of a packet into portions and providing the portions in parallel over a first data path having a first width to a classification engine. Step 1004 comprises classifying, in the packet classification engine, the packet responsive to the packet portions received over the first data path and providing data representative of the packet classification. Step 1006 comprises associating the data representative of the packet classification with the packet to form an associated packet, and providing the associated packet over a second data path having a second width less than the first width.

In one implementation, the step of providing the packet portions over the first data path comprises providing each of the bits of some or all of the packet in parallel over the first data path to the classification engine.

In a second implementation, the associating step comprises multiplexing the data representative of the packet classification and some or all of the packet onto the second data path.

Figure 11:
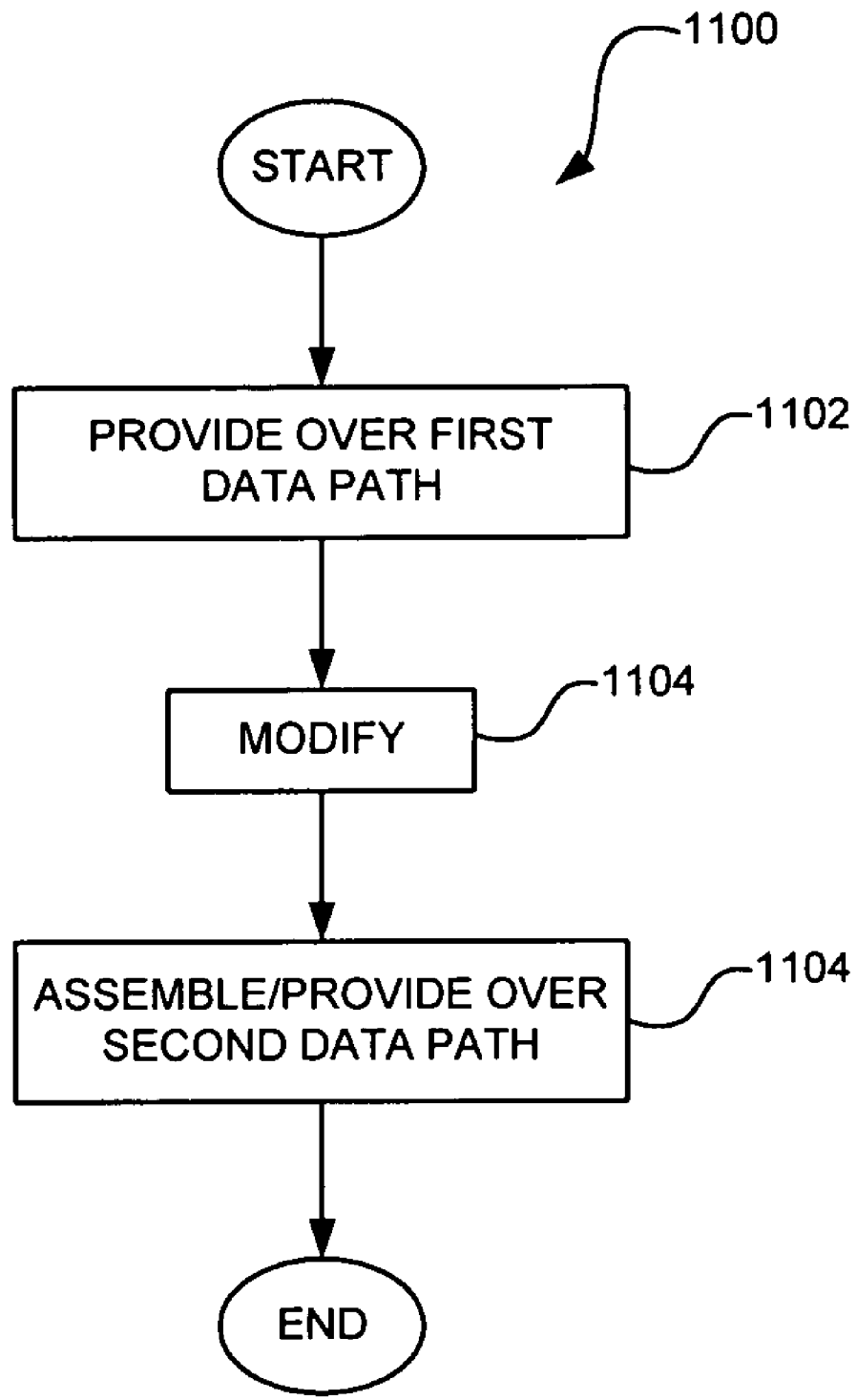
FIG. 11 is a flowchart of an embodiment of a method of modifying a packet in which sliced packet data is provided to a packet modification engine over a wide data path.

FIG. 11 is a flowchart of an embodiment 1100 of a method of modifying a packet. Step 1102 comprises providing some or all of a packet as packet portions and providing the portions in parallel over a first data path having a first width to a modification engine. Step 1104 comprises modifying, in the modification engine, one or more of the packet portions. Step 1106 comprises assembling a packet from the one or more modified and one or more unmodified packet portions, and providing the assembled packet over a second data path having a second width less than the first width.

Figure 12:
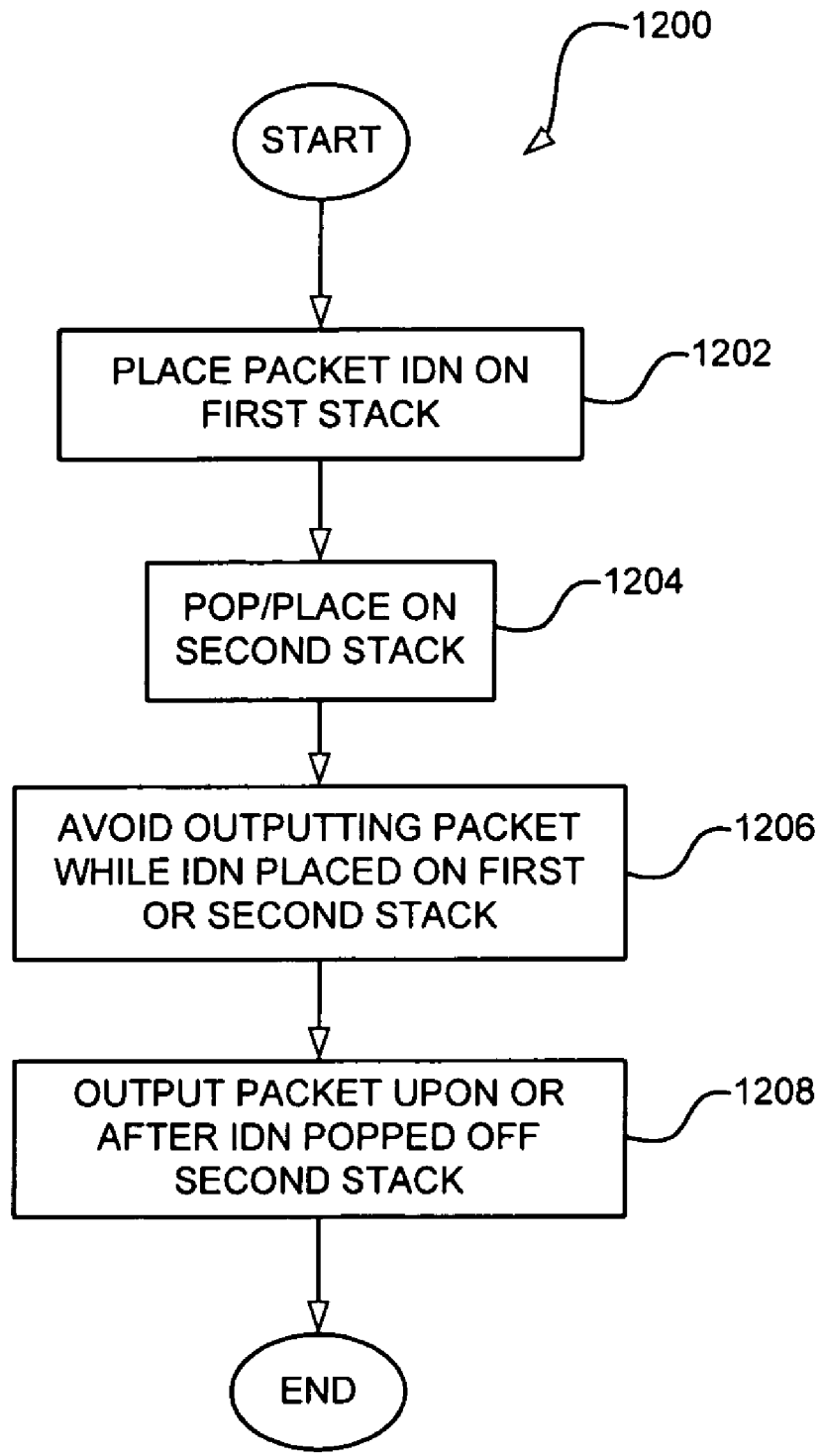
FIG. 12 is a flowchart of an embodiment of a method of controlling packet classification processing of a packet through first and second stacks.

FIG. 12 is a flowchart 1200 of an embodiment of a method of classifying a packet. Step 1202 comprises placing an identifier of a packet on a first FIFO buffer. Step 1204 comprises popping the identifier off the first FIFO buffer and placing it on a second FIFO buffer upon or after initiation of classification processing of the packet. Step 1206 comprises avoiding outputting the packet while an identifier of the same is placed on either the first or second FIFO buffers. Step 1208 comprises outputting the packet upon or after the identifier of the packet has been popped off the second FIFO buffer.

Figure 13:
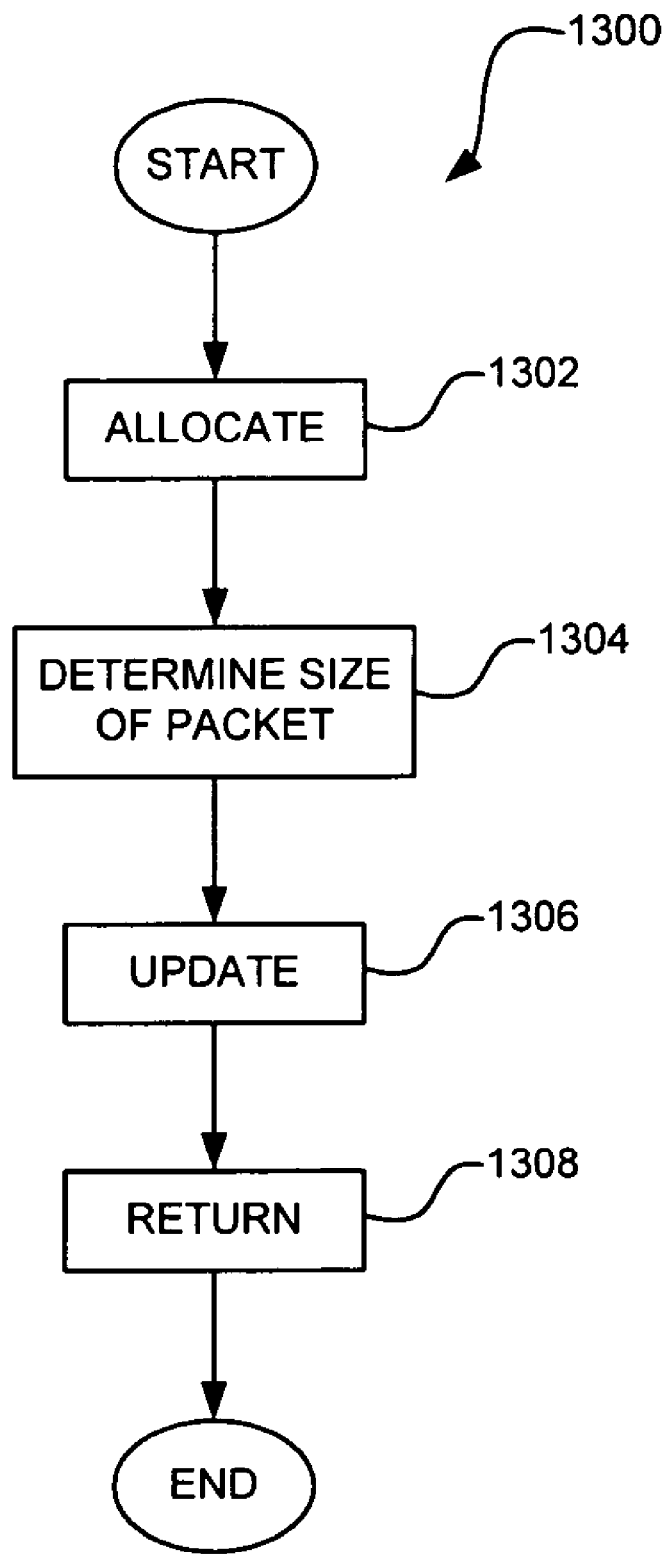
FIG. 13 is a flowchart of an embodiment of a method of maintaining packet statistics which involves allocating a packet size determiner to a packet from a pool of packet size determiners.

FIG. 13 is a flowchart illustrating an embodiment 1300 of a method of maintaining packet statistics. Step 1302 comprises allocating a packet size determiner to a packet from a pool of packet size determiners. Step 1304 comprises using the packet size determiner to determine the size of the packet. Step 1306 comprises updating one or more packet statistics responsive to the determined size of the packet. Step 1308 comprises returning the packet size determiner to the pool upon or after the same has determined the size of the packet.

In one implementation, the packet size determiner is a counter which counts the size of the packet. In a second implementation, the method further comprises queuing one or more statistics update requests.

In one implementation example, the one or more packet statistics indicate the cumulative size of packets which have met specified processing conditions or hits, and step 1306 comprises incrementing a cumulative size statistic for a particular processing condition or hit by the determined size of the packet if the packet meets that particular processing condition or hit.

Figure 14:
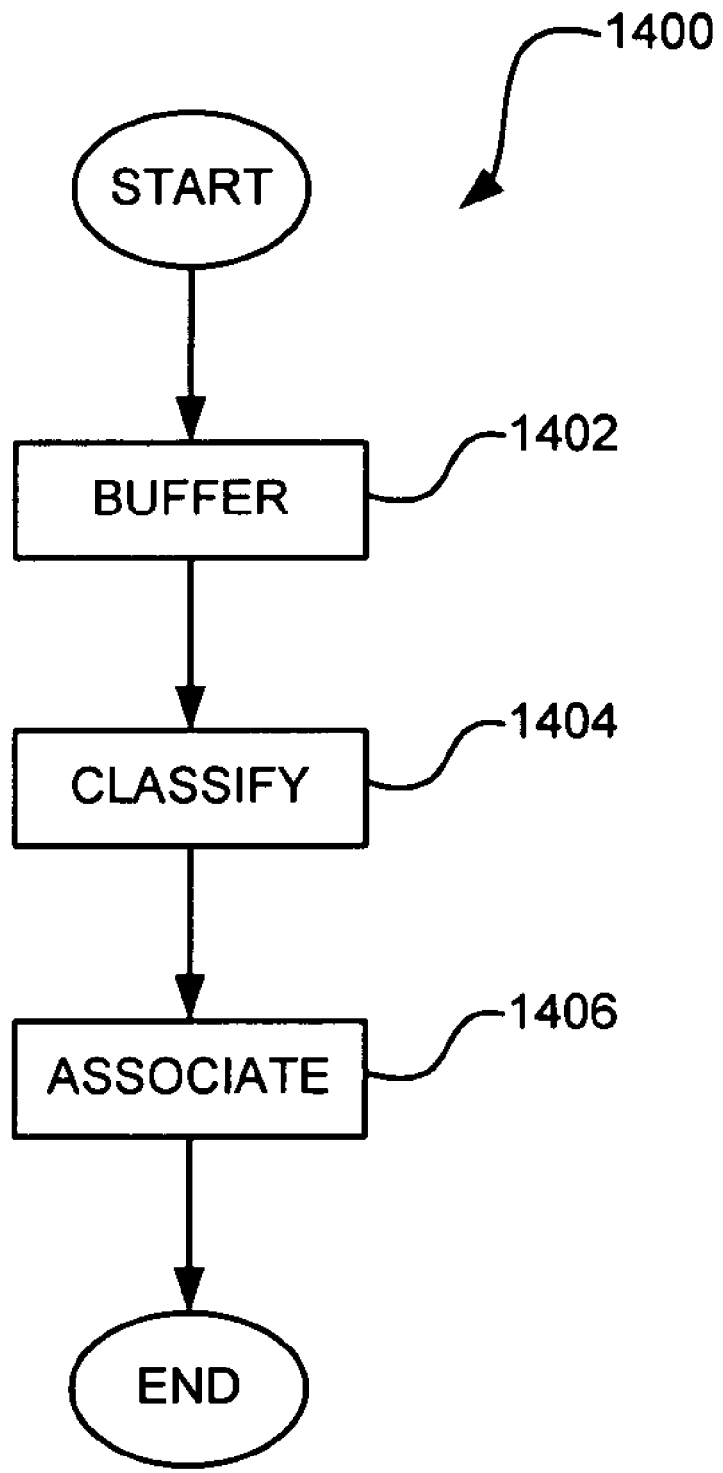
FIG. 14 is a flowchart of an embodiment of a method of classifying a packet which involves buffering the packet in a buffer upon or after ingress thereof, and associating packet classification data with the packet as retrieved directly from the buffer to form a classified packet on an egress data path.

FIG. 14 illustrates an embodiment 1400 of a method of classifying a packet. Step 1402 comprises buffering a packet in a buffer upon or after ingress thereof. Step 1404 comprises classifying the packet and providing data representative of the packet classification. Step 1406 comprises associating the data representative of the packet classification with some or all of the packet as directly retrieved from the buffer to form a packet on an egress data path.

In one implementation, step 1406 comprises multiplexing the data representative of the packet classification onto a data path followed by some or all of the packet as directly retrieved from the buffer.

Figure 15:
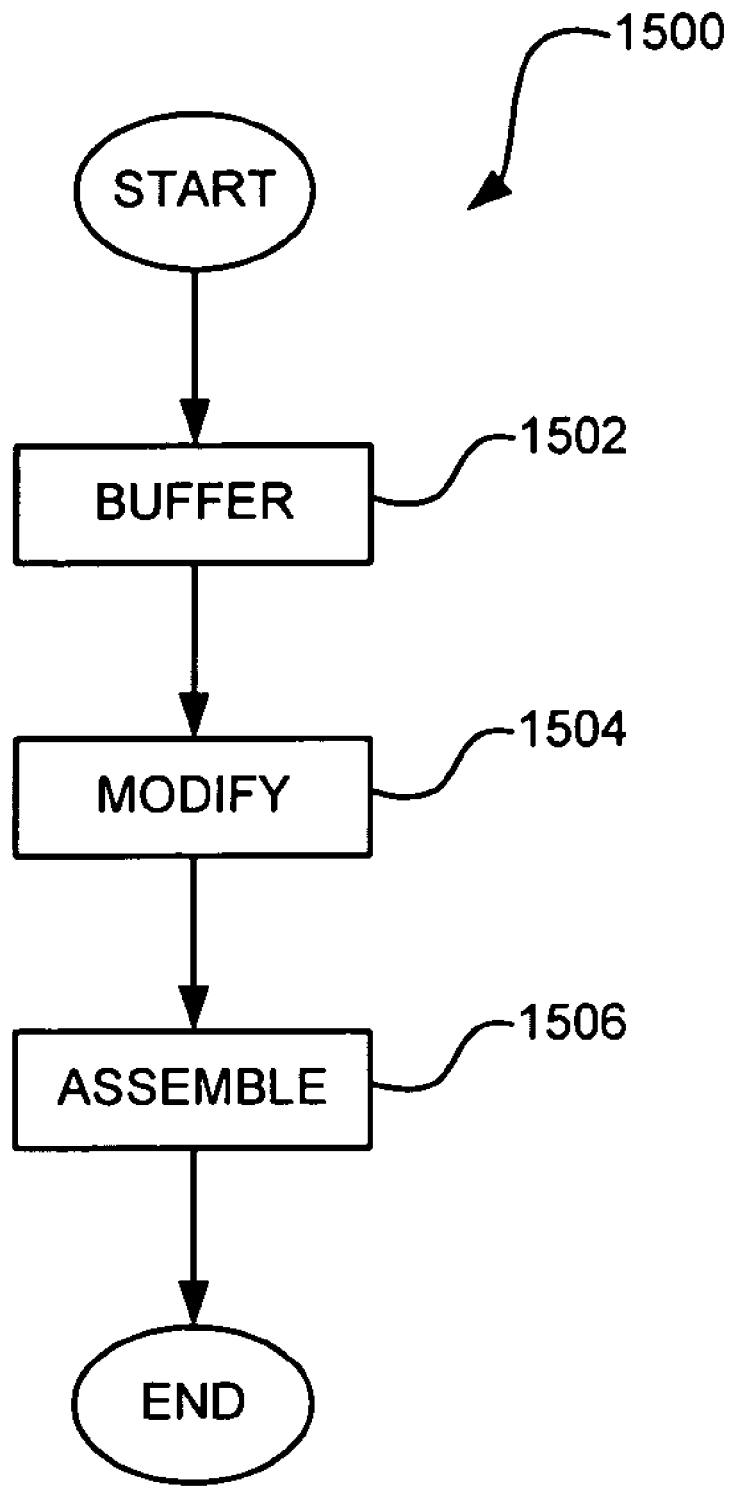
FIG. 15 is a flowchart of an embodiment of a method of modifying a packet which involves buffering the packet in a buffer upon or after ingress thereof, and assembling a packet on an egress data path from one or more modified portions of the packet, and one or more unmodified portions as retrieved directly from the buffer.

FIG. 15 illustrates an embodiment 1500 of a method of modifying a packet. Step 1502 comprises buffering the packet in a buffer upon ingress thereof. Step 1504 comprises modifying one or more portions of the packet. Step 1506 comprises assembling the one or more modified portions of the packet with one or more unmodified portions of the packet as retrieved directly from the buffer to form an assembled packet on an egress data path.

In one implementation, the method comprises providing a list indicating which portions of the assembled packet are to comprise modified portions of an ingress packet, and which portions are to comprise unmodified portions of the ingress packet, and step 1506 comprises assembling the assembled packet responsive to the list.

Figure 16:
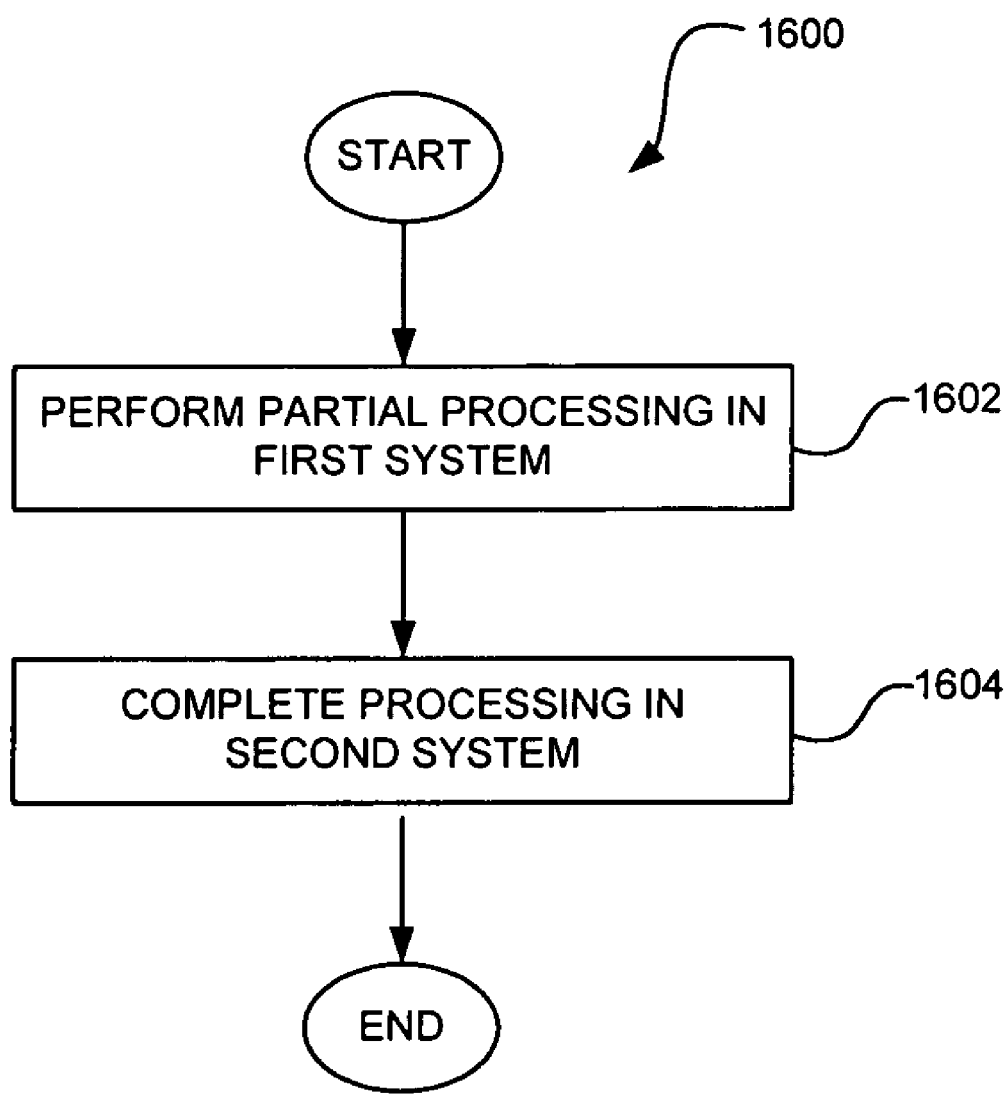
FIG. 16 is a flowchart of an embodiment of a method of performing classification processing of a packet in a cascaded combination of multiple, replicated packet classification systems.

FIG. 16 illustrates an embodiment 1600 of a method of processing a packet in a cascaded combination of multiple, replicated packet processing systems. In one implementation, each of systems is either a packet classification system or a packet modification system, and the processing which is performed by each system is either classification processing or modification processing as the case may be. Step 1602 comprises performing partial processing of a packet in a first of the replicated packet processing systems, and step 1604 comprises completing processing of the packet in a second of the replicated packet processing systems.

In one implementation, the second packet processing system is the last of a plurality of replicated packet processing systems, and the first packet processing system is either the first or next to last packet processing system in the plurality of packet processing systems, wherein partial processing of a packet is performed in the first replicated packet processing system, and processing is completed in the second replicated packet processing system.

Figure 17:
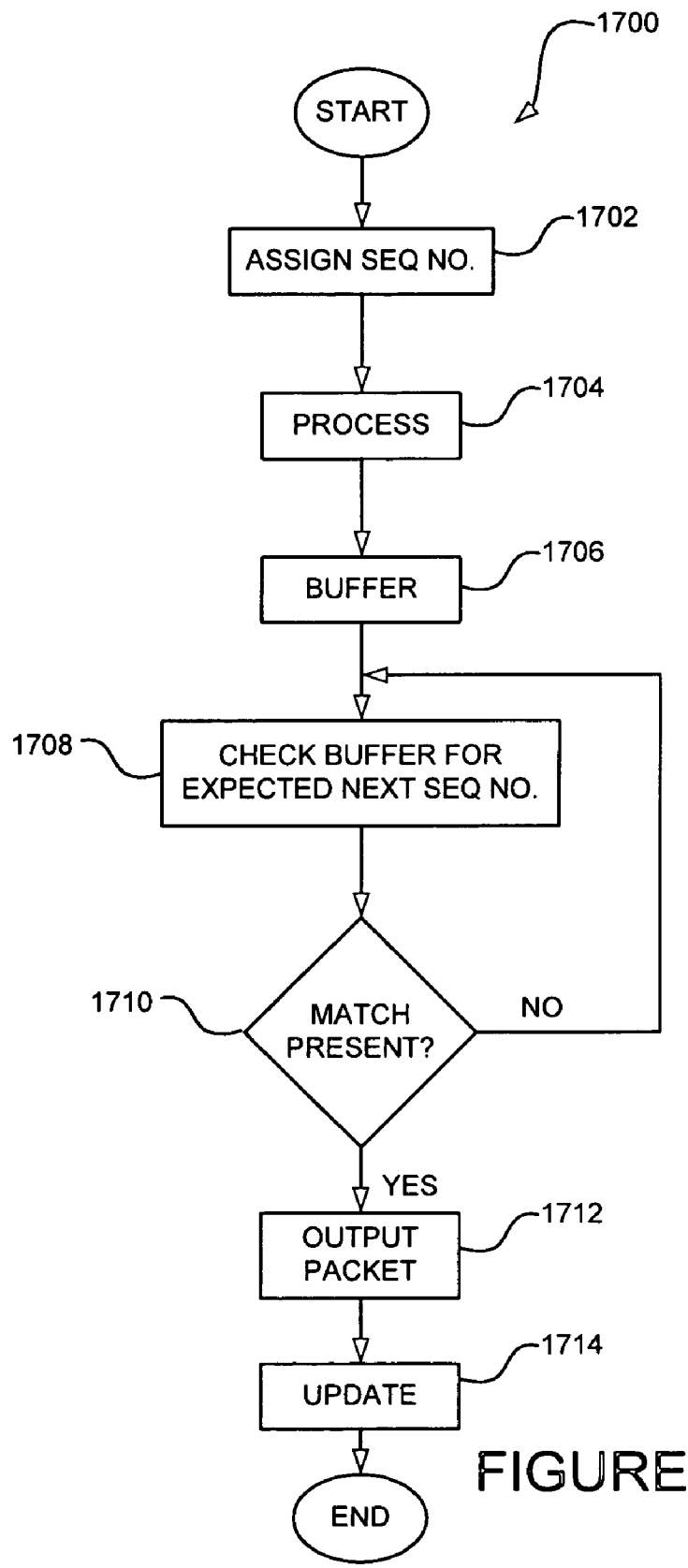
FIG. 17 is a flowchart of an embodiment of a method of preventing re-ordering of packets in a packet processing system.

FIG. 17 illustrates an embodiment 1700 of a method of preventing re-ordering of packets in a packet processing system. Step 1702 comprises assigning a sequence number to a packet upon or after ingress thereof to the system. Step 1704 comprises processing the packet. Step 1706 comprises storing data representative of the packet in a buffer. Step 1708 comprises checking the buffer for an entry matching an expected next sequence number. Inquiry step 1710 comprises determining if a match is present. If so, steps 1712 and 1714 are performed. Step 1712 comprises outputting the corresponding packet, and step 1714 comprises updating the expected next sequence number to reflect the outputting of the packet. If not, the method loops back to step 1708, thus deferring outputting a packet if a match is not present.

In one implementation, steps 1708-1714 comprise maintaining an expected next sequence number for each of a plurality of output channels, checking the buffer for a match for each of the channels, outputting the corresponding packet on a channel if a match for that channel is present and updating the expected next sequence number for that channel, and deferring outputting a packet on a channel if a match for that channel is not present.

While various embodiments of the invention have been described, it will be apparent to those of ordinary skill in the art that many more embodiments and implementations are possible that are within the scope of this invention.

What is claimed is:

1. A packet classification system comprising:

a slicer for slicing some or all of a packet into portions and providing the portions in parallel over a first data path having a first width to a classification engine;

the packet classification engine configured to classify the packet responsive to the packet portions received over the first data path and provide data representative of the packet classification; and an associator for associating the data representative of the packet classification with some or all of the packet, and providing the associated packet over a second data path having a second width less than the first width.

2. The system of claim 1 wherein the slicer comprises a plurality of memories configured to store some or all of the packet, and provide the portions thereof in parallel over the first data path to the classification engine.

3. The system of claim 2 wherein the plurality of memories are configured to provide each of the bits of some or all of the packet in parallel over the first data path to the classification engine.

4. The system of claim 1 wherein the associator comprises a multiplexor configured to multiplex onto the second data path the data representative of the packet classification and some or all of the packet.

5. A packet modification system comprising:

a buffer for providing some or all of a packet as packet portions and providing the portions in parallel over a first data path having a first width to a modification engine;

the modification engine configured to receive the packet portions over the first data path, and, responsive thereto, modify one or more of the packet portions; and an assembler for assembling a packet from one or more modified and one or more unmodified packet portions, and providing the assembled packet over a second data path having a second width less than the first width.

6. The system of claim 5 wherein the buffer comprises a plurality of memories configured to store a packet and provide portions thereof in parallel over the first data path to the modification engine.

7. A packet classification system comprising:

control logic for maintaining first and second stacks, the first stack for identifying those packets which are awaiting classification by the packet classification system, and the second stack for identifying those packets which are undergoing classification by the classification system, wherein the control logic is configured to place an identifier of a packet on the first stack upon or after receipt of the packet by the packet classification system, pop the identifier off the first stack and place it on the second stack upon or after initiation of classification processing of the packet by the packet classification system, and pop the identifier off the second stack upon or after completion of classification processing of the packet by the packet classification system, and the packet classification system is prevented from outputting a packet while an identifier of the same is placed on either the first or second stacks, and is free to output the packet upon or after the identifier of the packet has been popped off the second stack.

8. The system of claim 7 wherein the control logic is a state machine.

9. A method of classifying a packet comprising:
slicing some or all of a packet into portions and providing the portions in parallel over a first data path having a first width to a classification engine;
in the packet classification engine, classifying the packet responsive to the packet portions received over the first data path and providing data representative of the packet classification; and
associating the data representative of the packet classification with the packet to form an associated packet, and providing the associated packet over a second data path having a second width less than the first width.

10. The method of claim 9 wherein the providing step comprises providing each of the bits of some or all of the packet in parallel over the first data path to the classification engine.

11. The method of claim 9 wherein the associating step comprises multiplexing the data representative of the packet classification and some or all of the packet onto the second data path.

12. A method of modifying a packet comprising:
slicing some or all of a packet into packet portions and providing the portions in parallel over a first data path having a first width to a modification engine;
in the modification engine, modifying one or more packet portions; and
assembling a packet from one or more modified and one or more unmodified packet portions, and providing the assembled packet over a second data path having a second width less than the first width.

13. A method of classifying a packet comprising:
placing an identifier of a packet on a first stack;
popping the identifier off the first stack and placing it on a second stack upon or after initiation of classification processing of the packet;
popping the identifier off the second stack upon or after completion of classification processing of the packet;
avoiding outputting the packet while an identifier of the same is placed on either the first or second stacks; and
outputting the packet upon or after the identifier of the packet has been popped off the second stack.

14. A packet classification system comprising:
means for buffering a packet upon or after ingress thereof to the system;
means for slicing some or all of the packet into portions and providing the portions in parallel over a first data path having a first width to packet classification means, the packet classification means configured for classifying the packet responsive to the packet portions, and providing data representative of the packet classification;
means for associating the packet classification data with the packet as directly retrieved from the means for buffering to form an associated packet, and providing the associated packet over a second data path having a second width less than the first width; and
control means for maintaining first and second stacks, placing an identifier of a packet on the first stack upon or after receipt thereof by the system, popping the packet identifier off the first stack and placing it on the second stack upon or after initiation of classification processing of the packet by the packet classification means, popping the packet identifier off the second stack upon or after completion of classification processing of the packet by the packet classification means, preventing egress of the packet from the system while the packet identifier is placed on either the first or second stacks, and allowing egress of the packet from the system upon or after the packet identifier has been popped from the second stack.

15. A packet modification system comprising:
means for buffering a packet upon or after ingress thereof to the system;
means for slicing some or all of the packet into portions and providing the portions in parallel over a first data path having a first width to modification means, the modification means configured for modifying the packet, or one or more portions thereof; and
means for assembling one or more modified portions of the packet with one or more unmodified portions of the packet retrieved directly from the means for buffering to form an assembled packet, and providing the assembled packet over a second data path having a second width less than the first width.

16. A method of classifying a packet comprising:
a step for buffering the packet in a buffer upon or after ingress thereof;
a step for slicing some or all of the packet into portions and providing the portions in parallel over a first data path having a first width to a packet classification engine;
in the packet classification engine, a step for classifying the packet responsive to the one or more packet portions, and providing data representative of the packet classification;
a step for associating the packet classification data with the packet as directly retrieved from the buffer to form an associated packet, and providing the associated packet over a second data path having a second width less than the first width;
a step for placing an identifier of the packet on a first stack upon or after ingress thereof;
a step for popping the packet identifier off the first stack and placing it on a second stack upon or after initiation of classification processing of the packet by the packet classification engine;
a step for popping the packet identifier off the second stack upon or after completion of classification processing of the packet by the packet classification engine; and
a step for preventing egress of the packet while the packet identifier is on either the first or second stacks, and allowing egress of the packet upon or after the packet identifier has been popped off the second stack.

17. A method of modifying a packet comprising:
a step for buffering a packet in a buffer upon or after ingress thereof;
a step for slicing some or all of the packet into portions and providing the portions in parallel over a first data path having a first width to a modification engine;
in the modification engine, a step for modifying the packet, or one or more portions thereof; and
a step for assembling one or more modified portions of the packet with one or more unmodified portions of the packet as directly retrieved from the buffer to form an assembled packet, and providing the assembled packet over a second data path having a second width less than the first width.

* * * * *